United States Patent
Sathyamurthy et al.

(10) Patent No.: US 11,943,377 B2
(45) Date of Patent: *Mar. 26, 2024

(54) MOBILE DEVICE HAVING A HIGH COEFFICIENT OF THERMAL SPREADING

(71) Applicant: Frore Systems Inc., San Jose, CA (US)

(72) Inventors: Prabhu Sathyamurthy, San Jose, CA (US); Suryaprakash Ganti, Los Altos, CA (US); Seshagiri Rao Madhavapeddy, La Jolla, CA (US)

(73) Assignee: Frore Systems Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,970

(22) Filed: May 4, 2022

(65) Prior Publication Data

US 2022/0263928 A1    Aug. 18, 2022

Related U.S. Application Data

(63) Continuation of application No. 17/095,690, filed on Nov. 11, 2020, now Pat. No. 11,356,542.

(51) Int. Cl.
*H04M 1/02*    (2006.01)
*H01L 23/46*   (2006.01)

(52) U.S. Cl.
CPC .................................. *H04M 1/026* (2013.01)

(58) Field of Classification Search
CPC ...... H04M 1/02; H04M 1/0202; H04M 1/026; H04M 1/0262; H04M 1/0279; H01L 23/34; H01L 23/36; H01L 23/3672; H01L 23/427; H01L 23/46; H01L 23/467; H01L 23/473; H01L 21/4882

See application file for complete search history.

(56) References Cited

U.S. PATENT DOCUMENTS

| | | |
|---|---|---|
| 6,588,497 B1 | 7/2003 | Glezer |
| 6,942,018 B2 | 9/2005 | Goodson |
| 7,205,057 B2 * | 4/2007 | McLean ............. H01M 8/2432 |
| | | 429/535 |
| 7,978,474 B2 | 7/2011 | Ali |
| 9,006,956 B2 | 4/2015 | Li |
| 9,668,334 B2 | 5/2017 | Refai-Ahmed |
| 10,409,340 B2 | 9/2019 | Jin |
| 10,775,861 B2 * | 9/2020 | North ...................... G06F 1/206 |
| 10,788,034 B2 * | 9/2020 | Ganti ................... H01L 23/473 |
| 2016/0363971 A1 * | 12/2016 | Delano ................... G06F 1/203 |
| 2020/0381339 A1 | 12/2020 | Ganti |
| 2021/0183739 A1 | 6/2021 | Sathyamurthy |
| 2021/0185853 A1 | 6/2021 | Ganti |

OTHER PUBLICATIONS

Electronics Cooling, A Figure of Merit for Smart Phone Thermal Management, Nov. 30, 2015.

* cited by examiner

*Primary Examiner* — Quochien B Vuong
(74) *Attorney, Agent, or Firm* — Van Pelt, Yi & James LLP

(57) ABSTRACT

A mobile device, such as a mobile phone, including a housing and active cooling cells is described. The active cooling cells are in the housing. The cooling cells utilize vibrational motion to drive a fluid such that the mobile phone has a coefficient of thermal spreading (CTS) greater than 0.5 for a steady-state power generated by the mobile phone of at least five watts.

21 Claims, 8 Drawing Sheets

MOBILE DEVICE HAVING A HIGH COEFFICIENT OF THERMAL SPREADING

CROSS REFERENCE TO OTHER APPLICATIONS

This application is a continuation of U.S. patent application Ser. No. 17/095,690, entitled MOBILE DEVICE HAVING A HIGH COEFFICIENT OF THERMAL SPREADING filed Nov. 11, 2020 which is incorporated herein by reference for all purposes.

BACKGROUND OF THE INVENTION

As computing devices grow in speed and computing power, the heat generated by the computing devices also increases. Various mechanisms have been proposed to address the generation of heat. Active devices, such as fans, may be used to drive air through large computing devices, such as laptop computers or desktop computers. Passive cooling devices, such as heat spreaders, may be used in smaller, mobile computing devices, such as smartphones, virtual reality devices and tablet computers. However, such active and passive devices may be unable to adequately cool both mobile devices such as smartphones and larger devices such as laptops and desktop computers. For example, a smartphone or notebook computer may have standards not only for the maximum temperature at which its integrated circuits run, but also on the maximum local and average temperatures of the housing. Such standards for temperature (s) of the housing may improve the comfort of the user by preventing hot spots which may burn a user during use. However, achieving such standards, particularly without sacrificing performance and/or size, is challenging. Consequently, additional cooling solutions for computing devices are desired.

BRIEF DESCRIPTION OF THE DRAWINGS

Various embodiments of the invention are disclosed in the following detailed description and the accompanying drawings.

DETAILED DESCRIPTION

Figure 1A:
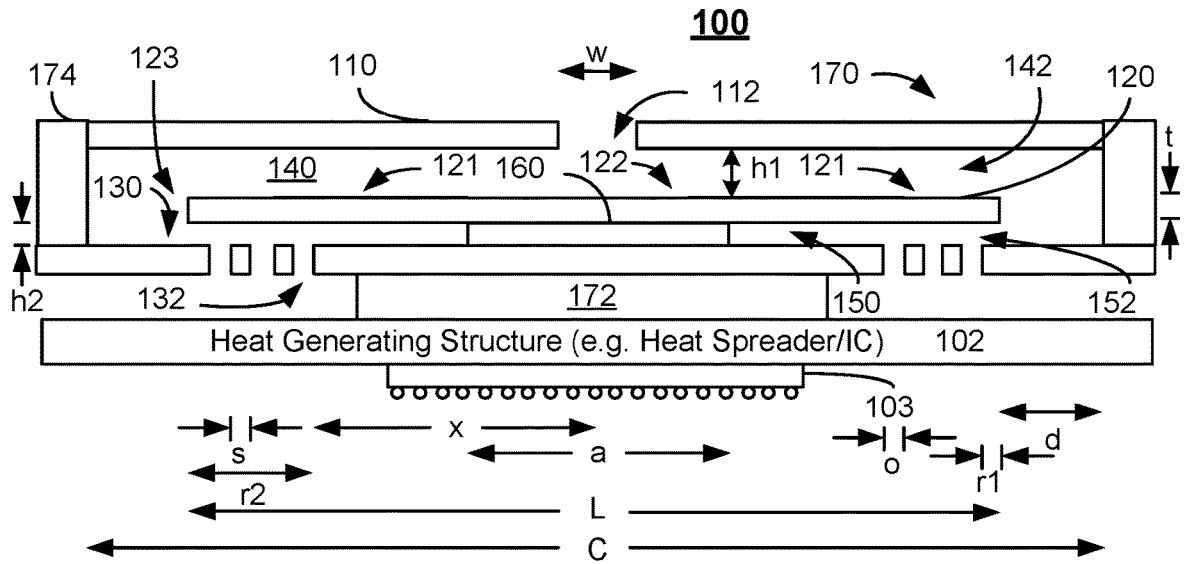
FIGS. 1A-1F depict an embodiment of an active cooling system usable in a device having a high coefficient of thermal spreading.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Larger devices, such as laptop or desktop computers, use electric fans that have rotating blades to manage heat. The fan can be energized in response to an increase in temperature of internal components. The fans drive air through the larger devices to cool internal components. However, such fans are typically too large for mobile devices such as smartphones or for thinner devices such as tablet or notebook computers. Fans also may have limited efficacy because of the boundary layer of air existing at the surface of the components, provide a limited airspeed for air flow across the hot surface desired to be cooled and may generate an excessive amount of noise. Passive cooling solutions may include components such as a heat spreader, a heat pipe, or a vapor chamber to transfer heat from a hot component such as a processor. Although a heat spreader somewhat mitigates the temperature increase at hot spots, the amount of heat produced in current and future devices may not be adequately addressed. Similarly, a heat pipe or vapor chamber may provide an insufficient amount of heat transfer to remove or sufficiently spread excessive heat generated.

For example, a notebook computer, smart phone or other mobile device utilizes a processor or other integrated circuit that frequently reaches a temperature of ninety degrees Celsius or more during use. A heat spreader (or heat pipe) is generally in physical contact with the integrated circuit in order to conduct heat from the integrated circuit. The heat spreader is larger than the integrated circuit to act as a heat sink and to attempt to reduce the occurrence of hot spots on the surface of the housing of the mobile device. In a larger mobile device such as a laptop computer, a fan may be located distal from the integrated circuit to transfer heat from the heat spreader or heat pipe to the surrounding environment. However, the heat spreader typically still undergoes a significant increase in temperature. During sustained use, the steady-state temperature of the heat spreader may reach approximately eighty to ninety degrees Celsius (e.g. eighty-five through eighty-seven degrees Celsius or higher) for an integrated circuit at ninety degrees Celsius. The housing of the mobile device is very close to the heat spreader. For example, in a laptop computer, the housing may be 0.5 millimeters from the heat spreader. For a mobile device such as a smartphone, the housing may be even closer, such as 0.3 millimeters from the heat spreader. The heat spreader thus still transfers heat to the interior surface of the housing, for example via radiation. The housing undergoes significant heating in the local region of the integrated circuit. The exterior surface temperature (also termed the skin temperature) rises significantly in this region. Thus, a hot spot is formed. For example, the skin temperature of the housing closest to the integrated circuit may be on the order of eighty degrees Celsius or higher for a processor at ninety degrees Celsius. Thus, additional cooling solutions capable of being used with mobile devices are desired.

A mobile phone including a housing and active cooling cells is described. The active cooling cells are in the housing. The cooling cells utilize vibrational motion to drive a fluid for a heat-generating device such that the mobile phone has a coefficient of thermal spreading (CTS) greater than 0.5 for a steady-state power generated by the mobile phone (e.g. by the heat-generating device) of at least five watts. In some embodiments, the CTS is greater than 0.7. In some embodiments, the CTS is greater than 0.8. In some such embodiments, the CTS is greater than 0.9. In some embodiments, a CTS in this range (e.g. 0.5, 07, 0.8, 0.9 or more) is achieved for steady-state power generated of at least seven watts.

In some embodiments, the cooling cells are configured to utilize vibrational motion to drive a fluid toward a heat-generating structure. Thus, the fluid may impinge on the heat-generating structure. In some embodiments, the active cooling cells include cooling elements having a first side and as second side. The cooling elements use the vibrational motion to drive the fluid from the first side to the second side. In some embodiments, each of the active cooling cells includes at least one cooling element configured to undergo the vibrational motion to drive the fluid toward the heat-generating structure. The mobile phone may include a heat spreader disposed between the active cooling cells and the heat-generating structure. The active cooling cells may be configured to drive the fluid toward the heat spreader.

The fluid is sealed within the housing in some embodiments, but may be exchanged with the environment external to the housing in other embodiments. In some embodiments, the mobile phone is configured to have a fluid path such that the fluid travels toward the heat-generating structure and past at least one additional structure before returning to a side of the plurality of active cooling cells distal from the heat-generating structure. In some embodiments, the mobile phone includes vent(s) configured to allow the fluid to exit the housing to an environment external to the housing and to receive additional fluid from the environment.

In some embodiments, a mobile device is described. The mobile device includes a housing and active cooling cells. The housing has at least one dimension with a length of not more than twenty-five millimeters. In some embodiments, the length of the dimension does not exceed ten millimeters. In some embodiments, the length of the dimension does not exceed eight millimeters. The active cooling cells residing in the housing and are configured to utilize vibrational motion to drive a fluid such that the mobile device has a coefficient of thermal spreading (CTS) greater than 0.5 for a total steady-state power generated by the mobile device of at least five watts. In some embodiments, the CTS is greater than 0.7. In some embodiments, the CTS is greater than 0.8. In some such embodiments, the CTS is greater than 0.9. In some embodiments, a CTS in this range (e.g. 0.5, 07, 0.8, 0.9 or more) is achieved for steady-state power generated of at least seven watts.

In some embodiments, the cooling cells are configured to utilize vibrational motion to drive a fluid toward a heat-generating structure. In some embodiments, the active cooling cells include cooling elements having a first side and as second side. The cooling elements use the vibrational motion to drive the fluid from the first side to the second side. In some embodiments, each of the active cooling cells includes at least one cooling element configured to undergo the vibrational motion to drive the fluid toward the heat-generating structure. The fluid is sealed within the housing of the mobile device in some embodiments. In such embodiments, the mobile device is configured to have a fluid path such that the fluid travels toward the heat-generating structure and past at least one additional structure before returning to a side of the plurality of active cooling cells distal from the heat-generating structure. In some embodiments, the mobile device includes vent(s) configured to allow the fluid to exit the housing to an environment external to the housing and to receive additional fluid from the environment.

A method for cooling a mobile device having a housing is described. The method includes driving active cooling cells residing in the housing. The active cooling cells are configured to utilize vibrational motion to drive a fluid such that the mobile device has a coefficient of thermal spreading (CTS) greater than 0.5 for a total steady-state power generated by the mobile phone of at least five watts. In some embodiments, the method includes driving the plurality of active cooling cells such that the vibrational motion has a frequency of at least 10 kHz. In some embodiments, the method includes driving the active cooling cells such that the vibrational motion is substantially at a structural resonance for the plurality of cooling cells and substantially at a fluidic resonance for the plurality of cooling cells.

Figure 1B:
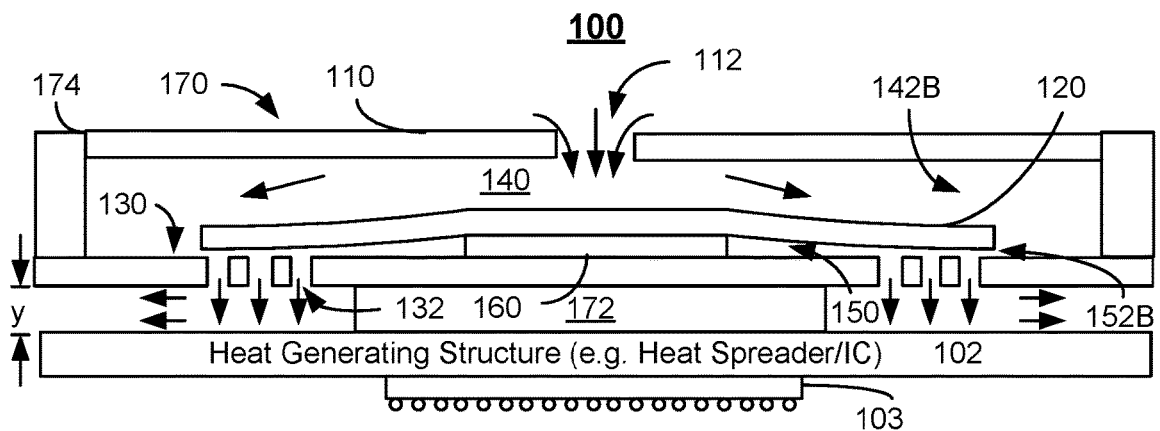
Figure 1C:
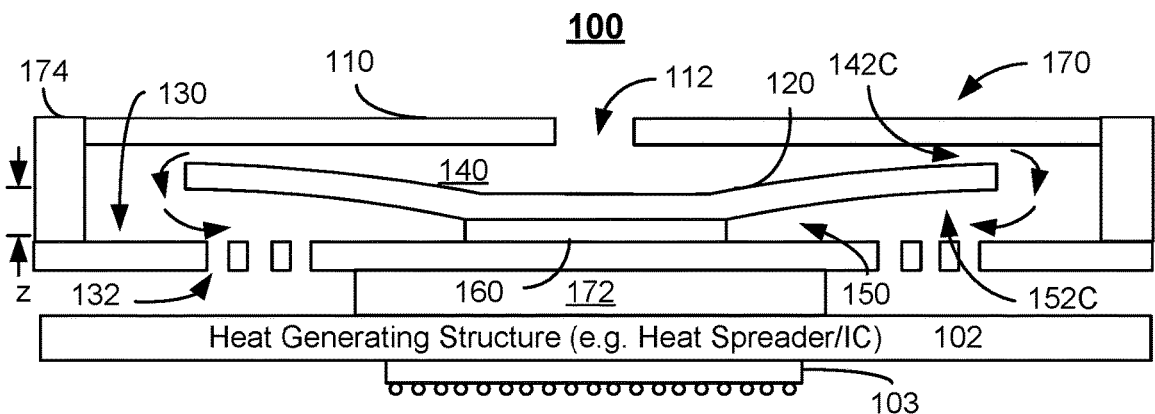
Figure 1D:
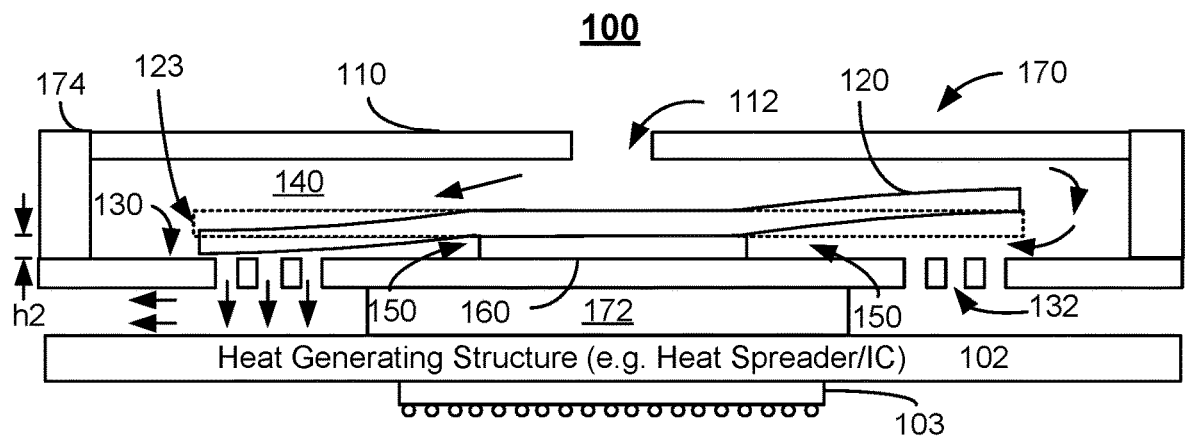
Figure 1E:
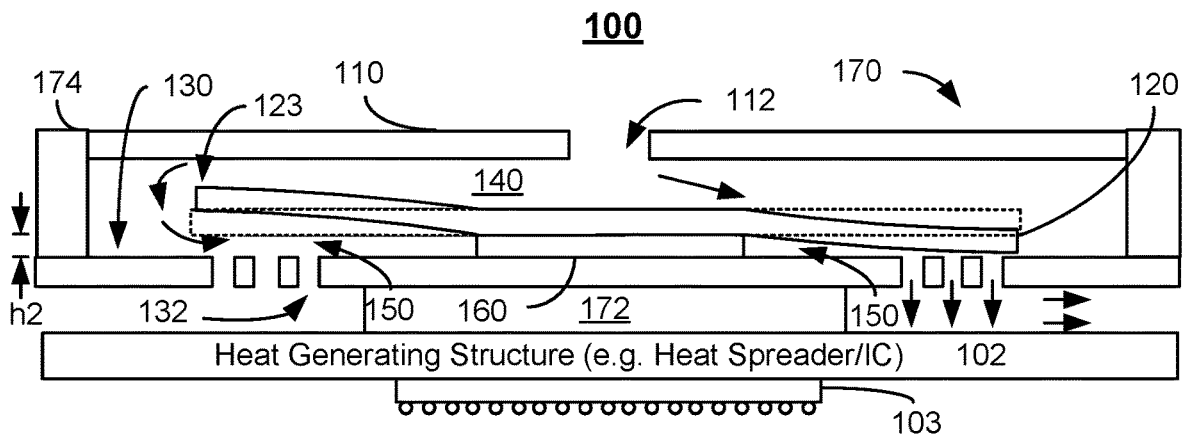
Figure 1F:
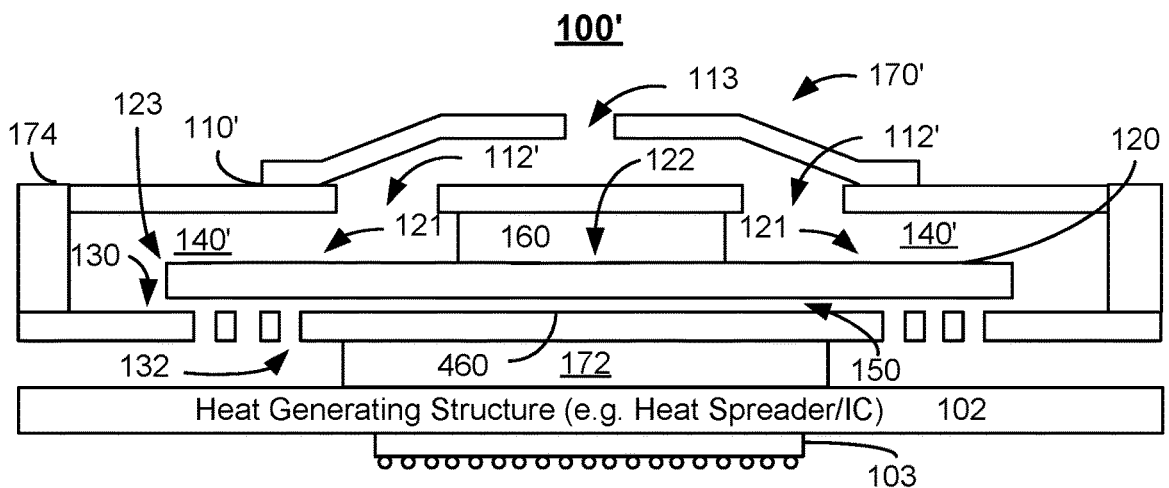

FIGS. 1A-1F are diagrams depicting exemplary embodiments of active cooling systems 100 and 100' usable with heat-generating structure 102 and forming an active heat sink. For clarity, only certain components are shown. FIGS. 1A-1F are not to scale. Although shown as symmetric, cooling system(s) 100 and/or 100' need not be. FIGS. 1A-1E depict various modes of one embodiment of a cooling system. FIG. 1F depicts another embodiment of a cooling system 100'.

Cooling system 100 includes cooling element 120 and support structure 170. In the embodiment shown in FIGS. 1A-1E, support structure 170 includes top plate 110 having vent 112 therein, orifice plate 130 having orifices 132 therein, anchor 160, pedestal 172 and sidewalls 174. Cooling element 120 divides the interior of support structure 170 into top chamber 140 and bottom chamber 150. Chambers 140 and 150 (collectively chamber 140/150) are formed within orifice, or bottom, plate 130, top plate 110 and sidewalls 174. Support structure is thermally coupled to heat-generating structure 102 via pedestal 172. Pedestal 172 also provides a space for fluid to flow between orifice plate 130 and heat-generating structure 102 (i.e. a jet channel). In some embodiments, pedestal 172 may be replaced or augmented by pedestal(s) (not shown) at the edges of a cooling cell 100.

Cooling element 120 is supported at its central region by anchor 160. Regions of cooling element 120 closer to and including portions of the cooling element's perimeter (e.g. tip 123) vibrate when actuated. In some embodiments, tip 123 of cooling element 120 includes a portion of the perimeter furthest from anchor 160 and undergoes the largest deflection during actuation of cooling element 120. For clarity, only one tip 123 of cooling element 120 is labeled in FIG. 1A.

FIG. 1A depicts cooling system 100 in a neutral position. Thus, cooling element 120 is shown as substantially flat. For in-phase operation, cooling element 120 is driven to vibrate between positions shown in FIGS. 1B and 1C. This vibrational motion draws fluid (e.g. air) into vent 112, through chambers 140 and 150 and out orifices 132 at high speed and/or flow rates. For example, the speed at which the fluid impinges on heat-generating structure 102 may be at least thirty meters per second. In some embodiments, the fluid is driven by cooling element 120 toward heat-generating structure 102 at a speed of at least forty-five meters per second. In some embodiments, the fluid is driven toward heat-generating structure 102 by cooling element 120 at speeds of at least sixty meters per second. Other speeds may be possible in some embodiments. Cooling system 100 is also configured so that little or no fluid is drawn back into chamber 140/150 through orifices 132 by the vibrational motion of cooling element 120.

In the embodiment shown, heat generating structure 102 is a heat spreader or vapor chamber thermally connected to integrated circuit 103. Thus, integrated circuit 103 generates heat, which is transferred to heat-generating structure 102. Because cooling system 100 is thermally coupled to and cools structure 102, structure 102 is described as a heat-generating structure. However, in the embodiment shown, cooling of heat-generating structure 102 is a mechanism for managing heat produced by integrated circuit 103. In some embodiments, heat-generating structure 102 generates heat. For example, heat-generating structure may be an integrated circuit, such as integrated circuit 103, in the absence of a heat spreader. Thus, heat-generating structure 102 may include semiconductor component(s) including individual integrated circuit components such as processors, other integrated circuit(s) and/or chip package(s); sensor(s); optical device(s); one or more batteries; other component(s) of an electronic device such as a computing device; heat spreaders; heat pipes; other electronic component(s) and/or other device(s) desired to be cooled.

The devices in which cooling system 100 is desired to be used may also have limited space in which to place a cooling system. For example, cooling system 100 may be used in computing devices. Such computing devices may include but are not limited to smartphones, tablet computers, laptop computers, tablets, two-in-one laptops, hand held gaming systems, digital cameras, virtual reality headsets, augmented reality headsets, mixed reality headsets and other devices that are thin. In some embodiments, the computing device in which cooling system 100 is used need not be thin. For example, servers, desktop computers and/or other larger computing systems may also be cooled using cooling system 100. Cooling system 100 may be a micro-electro-mechanical system (MEMS) cooling system capable of residing within mobile computing devices and/or other devices having limited space in at least one dimension. For example, the total height of cooling system 100 (from the top of heat-generating structure 102 to the top of top plate 110) may be less than 2 millimeters. In some embodiments, the total height of cooling system 100 is not more than 1.5 millimeters. In some embodiments, the total height does not exceed two hundred and fifty micrometers. In some embodiments, this total height is not more than 1.1 millimeters. In some embodiments, the total height does not exceed one millimeter. Similarly, the distance between the bottom of orifice plate 130 and the top of heat-generating structure 102, y, may be small. In some embodiments, y is at least two hundred micrometers and not more than one millimeter. In some embodiments, y is at least two hundred micrometers and not more than three hundred micrometers. Thus, cooling system 100 is usable in computing devices and/or other devices having limited space in at least one dimension. However, nothing prevents the use of cooling system 100 in devices having fewer limitations on space and/or for purposes other than cooling. Although one cooling system 100 is shown (e.g. one cooling cell), multiple cooling systems 100 might be used in connection with heat-generating structure 102. For example, a one or two-dimensional array of cooling cells might be utilized.

Cooling system 100 is in communication with a fluid used to cool heat-generating structure 102. The fluid may be a gas or a liquid. For example, the fluid may be air. In some embodiments, the fluid includes fluid from outside of the device in which cooling system 100 resides (e.g. provided through external vents in the device). In some embodiments, the fluid circulates within the device in which cooling system resides (e.g. in an enclosed device).

Cooling element 120 can be considered to divide the interior of active cooling system 100 into top chamber 140 and bottom chamber 150. Top chamber 140 is formed by cooling element 120, the sides, and top plate 110. Bottom chamber 150 is formed by orifice plate 130, the sides, cooling element 120 and anchor 160. Top chamber 140 and bottom chamber 150 are connected at the periphery of cooling element 120 and together form chamber 140/150 (e.g. an interior chamber of cooling system 100).

The size and configuration of top chamber 140 may be a function of the cell (cooling system 100) dimensions, cooling element 120 motion, and the frequency of operation. Top chamber 140 has a height, h1. The height of top chamber 140 may be selected to provide sufficient pressure to drive the fluid to bottom chamber 150 and through orifices 132 at the desired flow rate and/or speed. Top chamber 140 is also sufficiently tall that cooling element 120 does not contact top plate 110 when actuated. In some embodiments, the height of top chamber 140 is at least fifty micrometers and not more than five hundred micrometers. In some embodiments, top chamber 140 has a height of at least two hundred and not more than three hundred micrometers.

Bottom chamber 150 has a height, h2. In some embodiments, the height of bottom chamber 150 is sufficient to accommodate the motion of cooling element 120. Thus, no portion of cooling element 120 contacts orifice plate 130 during normal operation. Bottom chamber 150 is generally smaller than top chamber 140 and may aid in reducing the backflow of fluid into orifices 132. In some embodiments, the height of bottom chamber 150 is the maximum deflection of cooling element 120 plus at least five micrometers and not more than ten micrometers. In some embodiments, the deflection of cooling element 120 (e.g. the deflection of tip 123), z, has an amplitude of at least ten micrometers and not more than one hundred micrometers. In some such embodiments, the amplitude of deflection of cooling element 120 is at least ten micrometers and not more than sixty micrometers. However, the amplitude of deflection of cooling element 120 depends on factors such as the desired flow rate through cooling system 100 and the configuration of cooling system 100. Thus, the height of bottom chamber 150 generally depends on the flow rate through and other components of cooling system 100.

Top plate 110 includes vent 112 through which fluid may be drawn into cooling system 100. Top vent 112 may have a size chosen based on the desired acoustic pressure in chamber 140. For example, in some embodiments, the width, w, of vent 112 is at least five hundred micrometers and not more than one thousand micrometers. In some embodiments, the width of vent 112 is at least two hundred fifty micrometers and not more than two thousand micrometers. In the embodiment shown, vent 112 is a centrally located aperture in top plate 110. In other embodiments, vent 112 may be located elsewhere. For example, vent 112 may be closer to one of the edges of top plate 110. Vent 112 may have a circular, rectangular or other shaped footprint. Although a single vent 112 is shown, multiple vents might be used. For example, vents may be offset toward the edges of top chamber 140 or be located on the side(s) of top chamber 140. Although top plate 110 is shown as substantially flat, in some embodiments trenches and/or other structures may be provided in top plate 110 to modify the configuration of top chamber 140 and/or the region above top plate 110.

Cooling element 120 includes an anchored region 122 and cantilevered arms 121. For simplicity, anchored region 122 and cantilevered arms 121 are only labeled in FIGS. 1A and 1F. Anchored region 122 is supported (e.g. held in place) in cooling system 100 by anchor 160. Cantilevered arms 121 undergo vibrational motion in response to cooling element 120 being actuated. In the embodiment shown in FIGS. 1A-1F, anchored region 122 is centrally located. In other embodiments, anchored region 122 may be at one edge of the actuator and outer region 128 at the opposing edge. In such embodiments, cooling element 120 is edge anchored. Although depicted as having a uniform thickness, in some embodiments, cooling element 120 may have a varying thickness.

Anchor 160 supports cooling element 120 at the central portion of cooling element 120. Thus, at least part of the perimeter of cooling element 120 is unpinned and free to vibrate. In some embodiments, anchor 160 extends along a central axis of cooling element 120 (e.g. perpendicular to the page in FIGS. 1A-1F). In such embodiments, portions of cooling element 120 that vibrate (e.g. cantilevered arms 121 including tip 123) move in a cantilevered fashion. Thus, cantilevered arms 121 of cooling element 120 may move in a manner analogous to the wings of a butterfly (i.e. in-phase) and/or analogous to a seesaw (i.e. out-of-phase). Thus, the cantilevered arms 121 of cooling element 120 that vibrate in a cantilevered fashion do so in-phase in some embodiments and out-of-phase in other embodiments. In some embodiments, anchor 160 does not extend along an axis of cooling element 120. In such embodiments, all portions of the perimeter of cooling element 120 are free to vibrate (e.g. analogous to a jellyfish). In the embodiment shown, anchor 160 supports cooling element 120 from the bottom of cooling element 120. In other embodiments, anchor 160 may support cooling element 120 in another manner. For example, anchor 160 may support cooling element 120 from the top (e.g. cooling element 120 hangs from anchor 160). Such an embodiment is shown and described in the context of FIG. 1F. In some embodiments, the width, a, of anchor 160 is at least 0.5 millimeters and not more than four millimeters. In some embodiments, the width of anchor 160 is at least two millimeters and not more than 2.5 millimeters. Anchor 160 may occupy at least ten percent and not more than fifty percent of cooling element 120.

Cooling element 120 has a first side and a second side. In some embodiments, the first side is distal from heat-generating structure 102 and the second side is proximate to heat-generating structure 102. In the embodiment shown in FIGS. 1A-1F, the first side of cooling element 120 is the top of cooling element 120 (closer to top plate 110) and the second side is the bottom of cooling element 120 (closer to orifice plate 130). Cooling element 120 is actuated to undergo vibrational motion as shown in FIGS. 1A-1F. The vibrational motion of cooling element 120 drives fluid from the first side of cooling element 120 (e.g. distal from heat-generating structure 102/from top chamber 140) to a second side of cooling element 120 (e.g. proximate to heat-generating structure 102/to bottom chamber 150). The vibrational motion of cooling element 120 draws fluid through vent 112 and into top chamber 140; forces fluid from top chamber 140 to bottom chamber 150; and drives fluid from bottom chamber 150 through orifices 132 of orifice plate 130.

Cooling element 120 has a length, L, that depends upon the frequency at which cooling element 120 is desired to vibrate. In some embodiments, the length of cooling element 120 is at least four millimeters and not more than ten millimeters. In some such embodiments, cooling element 120 has a length of at least six millimeters and not more than eight millimeters. The depth of cooling element 120 (e.g. perpendicular to the plane shown in FIGS. 1A-1F) may vary from one fourth of L through twice L. For example, cooling element 120 may have the same depth as length. The thickness, t, of cooling element 120 may vary based upon the configuration of cooling element 120 and/or the frequency at which cooling element 120 is desired to be actuated. In some embodiments, the cooling element thickness is at least two hundred micrometers and not more than three hundred and fifty micrometers for cooling element 120 having a length of eight millimeters and driven at a frequency of at least twenty kilohertz and not more than twenty-five kilohertz. The length, C of chamber 140/150 is close to the length, L, of cooling element 120. For example, in some embodiments, the distance, d, between the edge of cooling element 120 and the wall of chamber 140/50 is at least one hundred micrometers and not more than five hundred micrometers. In some embodiments, d is at least two hundred micrometers and not more than three hundred micrometers.

Cooling element 120 may be driven at a frequency that is at or near both the resonant frequency for an acoustic resonance of a pressure wave of the fluid in top chamber 140 and the resonant frequency for a structural resonance of cooling element 120. The portion of cooling element 120 undergoing vibrational motion is driven at or near resonance (the "structural resonance") of cooling element 120. This portion of cooling element 120 undergoing vibration may be cantilevered arm(s) 121 in some embodiments. The frequency of vibration for structural resonance is termed the structural resonant frequency. Use of the structural resonant frequency in driving cooling element 120 reduces the power consumption of cooling system 100. Cooling element 120 and top chamber 140 may also be configured such that this structural resonant frequency corresponds to a resonance in a pressure wave in the fluid being driven through top chamber 140 (the acoustic resonance of top chamber 140). The frequency of such a pressure wave is termed the acoustic resonant frequency. At acoustic resonance, a node in pressure occurs near vent 112 and an antinode in pressure occurs near the periphery of cooling system 100 (e.g. near tip 123 of cooling element 120 and near the connection between top chamber 140 and bottom chamber 150). The distance between these two regions is at or near C/2. Thus, C/2=nλ/4, where λ is the acoustic wavelength for the fluid and n is odd (e.g. n=1, 3, 5, etc.). For the lowest order mode, C=λ/2. Because the length of chamber 140 (e.g. C) is close to the length of cooling element 120, in some embodiments, it is also approximately true that L/2=nλ/4, where λ is the acoustic wavelength for the fluid and n is odd. Thus, the frequency at which cooling element 120 is driven, v, is at or near the structural resonant frequency for cooling element 120. The frequency v is also at or near the acoustic resonant frequency for at least top chamber 140. The acoustic resonant frequency of top chamber 140 generally varies less dramatically with parameters such as temperature and size than the structural resonant frequency of cooling element 120. Consequently, in some embodiments, cooling element 120 may be driven at (or closer to) a structural resonant frequency than to the acoustic resonant frequency.

Orifice plate 130 has orifices 132 therein. Although a particular number and distribution of orifices 132 are shown, another number, other location(s) and/or another distribution may be used. A single orifice plate 130 is used for a single cooling system 100. In other embodiments, multiple cooling systems 100 may share an orifice plate. For example, multiple cells 100 may be provided together in a desired configuration. In such embodiments, the cells 100 may be the same size and configuration or different size(s) and/or configuration(s). Orifices 132 are shown as having an axis oriented normal to a surface of heat-generating structure 102. In other embodiments, the axis of one or more orifices 132 may be at another angle. For example, the angle of the axis may be selected from substantially zero degrees and a nonzero acute angle. Orifices 132 also have sidewalls that are substantially parallel to the normal to the surface of orifice plate 130. In some embodiments, orifices may have sidewalls at a nonzero angle to the normal to the surface of orifice plate 130. For example, orifices 132 may be cone-shaped. Further, although orifice place 130 is shown as substantially flat, in some embodiments, trenches and/or other structures may be provided in orifice plate 130 to modify the configuration of bottom chamber 150 and/or the region between orifice plate 130 and heat-generating structure 102.

The size, distribution and locations of orifices 132 are chosen to control the flow rate of fluid driven to the surface of heat-generating structure 102. The locations and configurations of orifices 132 may be configured to increase/maximize the fluid flow from bottom chamber 150 through orifices 132 to the jet channel (the region between the bottom of orifice plate 130 and the top of heat-generating structure 102). The locations and configurations of orifices 132 may also be selected to reduce/minimize the suction flow (e.g. back flow) from the jet channel through orifices 132. For example, the locations of orifices are desired to be sufficiently far from tip 123 that suction in the upstroke of cooling element 120 (tip 123 moves away from orifice plate 13) that would pull fluid into bottom chamber 150 through orifices 132 is reduced. The locations of orifices are also desired to be sufficiently close to tip 123 that suction in the upstroke of cooling element 120 also allows a higher pressure from top chamber 140 to push fluid from top chamber 140 into bottom chamber 150. In some embodiments, the ratio of the flow rate from top chamber 140 into bottom chamber 150 to the flow rate from the jet channel through orifices 132 in the upstroke (the "net flow ratio") is greater than 2:1. In some embodiments, the net flow ratio is at least 85:15. In some embodiments, the net flow ratio is at least 90:10. In order to provide the desired pressure, flow rate, suction, and net flow ratio, orifices 132 are desired to be at least a distance, r1, from tip 123 and not more than a distance, r2, from tip 123 of cooling element 120. In some embodiments r1 is at least one hundred micrometers (e.g. r1≥100 μm) and r2 is not more than one millimeter (e.g. r2≤1000 μm). In some embodiments, orifices 132 are at least two hundred micrometers from tip 123 of cooling element 120 (e.g. r1≥200 μm). In some such embodiments, orifices 132 are at least three hundred micrometers from tip 123 of cooling element 120 (e.g. r1≥300 μm). In some embodiments, orifices 132 have a width, o, of at least one hundred micrometers and not more than five hundred micrometers. In some embodiments, orifices 132 have a width of at least two hundred micrometers and not more than three hundred micrometers. In some embodiments, the orifice separation, s, is at least one hundred micrometers and not more than one millimeter. In some such embodiments, the orifice separation is at least four hundred micrometers and not more than six hundred micrometers. In some embodiments, orifices 132 are also desired to occupy a particular fraction of the area of orifice plate 130. For example, orifices 132 may cover at least five percent and not more than fifteen percent of the footprint of orifice plate 130 in order to achieve a desired flow rate of fluid through orifices 132. In some embodiments, orifices 132 cover at least eight percent and not more than twelve percent of the footprint of orifice plate 130.

In some embodiments, cooling element 120 is actuated using a piezoelectric. Thus, cooling element 120 may be a piezoelectric cooling element. Cooling element 120 may be driven by a piezoelectric that is mounted on or integrated into cooling element 120. In some embodiments, cooling element 120 is driven in another manner including but not limited to providing a piezoelectric on another structure in cooling system 100. Cooling element 120 and analogous cooling elements are referred to hereinafter as piezoelectric cooling element though it is possible that a mechanism other than a piezoelectric might be used to drive the cooling element. In some embodiments, cooling element 120 includes a piezoelectric layer on substrate. The substrate may be a stainless steel, Ni alloy and/or Hastelloy substrate. In some embodiments, piezoelectric layer includes multiple sublayers formed as thin films on the substrate. In other embodiments, the piezoelectric layer may be a bulk layer affixed to the substrate. Such a piezoelectric cooling element 120 also includes electrodes used to activate the piezoelectric. The substrate functions as an electrode in some embodiments. In other embodiments, a bottom electrode may be provided between the substrate and the piezoelectric layer. Other layers including but not limited to seed, capping, passivation or other layers might be included in piezoelectric cooling element. Thus, cooling element 120 may be actuated using a piezoelectric.

In some embodiments, cooling system 100 includes chimneys (not shown) or other ducting. Such ducting provides a path for heated fluid to flow away from heat-generating structure 102. In some embodiments, ducting returns fluid to the side of top plate 110 distal from heat-generating structure 102. In some embodiments, ducting may instead direct fluid away from heat-generating structure 102 in a direction parallel to heat-generating structure 102 or perpendicular to heat-generating structure 102 but in the opposite direction (e.g. toward the bottom of the page). For a device in which fluid external to the device is used in cooling system 100, the ducting may channel the heated fluid to an outlet vent. In such embodiments, additional fluid may be provided from an inlet vent that is the same as or different from the outlet vent. In embodiments in which the device is enclosed, the ducting or another mechanism may provide a circuitous path back to the region near vent 112 and distal from heat-generating structure 102. Such a path allows for the fluid to dissipate heat before being reused to cool heat-generating structure 102. In other embodiments, ducting may be omitted or configured in another manner. Thus, the fluid is allowed to carry away heat from heat-generating structure 102.

Operation of cooling system 100 is described in the context of FIGS. 1A-1E. Although described in the context of particular pressures, gap sizes, and timing of flow, operation of cooling system 100 is not dependent upon the explanation herein. FIGS. 1B-1C depict in-phase operation of cooling system 100. Referring to FIG. 1B, cooling element 120 has been actuated so that cantilevered arms 121 and tip 123 move away from top plate 110. FIG. 1B can thus be considered to depict the end of a down stroke of cooling element 120. Because of the vibrational motion of cooling element 120, gap 152 for bottom chamber 150 has decreased in size and is shown as gap 152B. Conversely, gap 142 for top chamber 140 has increased in size and is shown as gap 142B. During the down stroke, a lower (e.g. minimum) pressure is developed at the periphery when cooling element 120 is at the neutral position. As the down stroke continues, bottom chamber 150 decreases in size and top chamber 140 increases in size as shown in FIG. 1C. Thus, fluid is driven out of orifices 132 in a direction that is at or near perpendicular to the surface of orifice plate 130 and/or the top surface of heat-generating structure 102. The fluid is driven from orifices 132 (and toward heat-generating structure 102 in the embodiment shown) at a high speed, for example in excess of thirty-five meters per second. Thus, fluid exits orifices 132 at the high speeds described herein. In some embodiments, the fluid then travels along the surface of heat-generating structure 102 and toward the periphery of heat-generating structure 102, where the pressure is lower than near orifices 132. Also in the down stroke, top chamber 140 increases in size and a lower pressure is present in top chamber 140. As a result, fluid is drawn into top chamber 140 through vent 112. The motion of the fluid into vent 112, through orifices 132, and along the surface of heat generating structure 102 is shown by unlabeled arrows in FIG. 1C.

Cooling element 120 is also actuated so that cantilevered arms 121 and thus tip 123 move away from heat-generating structure 102 and toward top plate 110. FIG. 1C can thus be considered to depict the end of an up stroke of cooling element 120. Because of the motion of cooling element 120, gap 142 has decreased in size and is shown as gap 142C. Gap 152 has increased in size and is shown as gap 152C. During the upstroke, a higher (e.g. maximum) pressure is developed at the periphery when cooling element 120 is at the neutral position. As the upstroke continues, bottom chamber 150 increases in size and top chamber 140 decreases in size as shown in FIG. 1C. Thus, the fluid is driven from top chamber 140 (e.g. the periphery of chamber 140/150) to bottom chamber 150. Thus, when tip 123 of cooling element 120 moves up, top chamber 140 serves as a nozzle for the entering fluid to speed up and be driven towards bottom chamber 150. The motion of the fluid into bottom chamber 150 is shown by unlabeled arrows in FIG. 1C. The location and configuration of cooling element 120 and orifices 132 are selected to reduce suction and, therefore, back flow of fluid from the jet channel (between heat-generating structure 102 and orifice plate 130) into orifices 132 during the upstroke. Thus, cooling system 100 is able to drive fluid from top chamber 140 to bottom chamber 150 without an undue amount of backflow of heated fluid from the jet channel entering bottom chamber 10.

The motion between the positions shown in FIGS. 1B and 1C is repeated. Thus, cooling element 120 undergoes vibrational motion indicated in FIGS. 1A-1C, drawing fluid through vent 112 from the distal side of top plate 110 into top chamber 140; transferring fluid from top chamber 140 to bottom chamber 150; and pushing the fluid through orifices 132 and toward heat-generating structure 102. As discussed above, cooling element 120 is driven to vibrate at or near the structural resonant frequency of cooling element 120. In some embodiments, this corresponds to the structural resonance of cantilevered arms 121. Further, the structural resonant frequency of cooling element 120 is configured to align with the acoustic resonance of the chamber 140/150. The structural and acoustic resonant frequencies are generally chosen to be in the ultrasonic range. For example, the vibrational motion of cooling element 120 may be at frequencies from 15 kHz through 30 kHz. In some embodiments, cooling element 120 vibrates at a frequency/frequencies of at least 20 kHz and not more than 30 kHz. The structural resonant frequency of cooling element 120 is within ten percent of the acoustic resonant frequency of cooling system 100. In some embodiments, the structural resonant frequency of cooling element 120 is within five percent of the acoustic resonant frequency of cooling system 100. In some embodiments, the structural resonant frequency of cooling element 120 is within three percent of the acoustic resonant frequency of cooling system 100. Consequently, efficiency and flow rate may be enhanced. However, other frequencies may be used.

Fluid driven toward heat-generating structure 102 may move substantially normal (perpendicular) to the top surface of heat-generating structure 102. In some embodiments, the fluid motion may have a nonzero acute angle with respect to the normal to the top surface of heat-generating structure 102. In either case, the fluid impinges on heat-generating structure 102. The fluid impinging on heat-generating structure 102 may thin and/or form apertures in the boundary layer of fluid at heat-generating structure 102. As a result, transfer of heat from heat-generating structure 102 may be improved. The fluid deflects off of heat-generating structure 102, traveling along the surface of heat-generating structure 102. In some embodiments, the fluid moves in a direction substantially parallel to the top of heat-generating structure 102. Thus, heat from heat-generating structure 102 may be extracted by the fluid. The fluid may exit the region between orifice plate 130 and heat-generating structure 102 at the edges of cooling system 100. Chimneys or other ducting (not shown) at the edges of cooling system 100 allow fluid to be carried away from heat-generating structure 102. In other embodiments, heated fluid may be transferred further from heat-generating structure 102 in another manner. The fluid may exchange the heat transferred from heat-generating structure 102 to another structure or to the ambient environment. Thus, fluid at the distal side of top plate 110 may remain relatively cool, allowing for the additional extraction of heat. In some embodiments, fluid is circulated, returning to distal side of top plate 110 after cooling. In other embodiments, heated fluid is carried away and replaced by new fluid at the distal side of cooling element 120. As a result, heat-generating structure 102 may be cooled.

FIGS. 1D-1E depict an embodiment of active cooling system 100 including centrally anchored cooling element 120 in which the cooling element is driven out-of-phase. More specifically, cantilevered arms 121 of cooling element 120 on opposite sides of anchor 160 (and thus on opposite sides of the central, anchored region 122 of cooling element 120 that is supported by anchor 160) are driven to vibrate out-of-phase. In some embodiments, cantilevered arms 121 of cooling element 120 on opposite sides of anchor 160 are driven at or near one hundred and eighty degrees out-of-phase. Thus, one cantilevered arm 121 of cooling element 120 vibrates toward top plate 110, while the other cantilevered arm 121 of cooling element 120 vibrates toward orifice plate 130/heat-generating structure 102. Movement of a cantilevered arms 121 of cooling element 120 toward top plate 110 (an upstroke) drives fluid in top chamber 140 to bottom chamber 150 on that side of anchor 160. Movement of a section of cooling element 120 toward orifice plate 130 drives fluid through orifices 132 and toward heat-generating structure 102. Thus, fluid traveling at high speeds (e.g. speeds described with respect to in-phase operation) is alternately driven out of orifices 132 on opposing sides of anchor 160. The movement of fluid is shown by unlabeled arrows in FIGS. 1D and 1E.

The motion between the positions shown in FIGS. 1D and 1E is repeated. Thus, cooling element 120 undergoes vibrational motion indicated in FIGS. 1A, 1D, and 1E, alternately drawing fluid through vent 112 from the distal side of top plate 110 into top chamber 140 for each side of cooling element 120; transferring fluid from each side of top chamber 140 to the corresponding side of bottom chamber 150; and pushing the fluid through orifices 132 on each side of anchor 160 and toward heat-generating structure 102. As discussed above, cooling element 120 is driven to vibrate at or near the structural resonant frequency of cooling element 120. Further, the structural resonant frequency of cooling element 120 is configured to align with the acoustic resonance of the chamber 140/150. The structural and acoustic resonant frequencies are generally chosen to be in the ultrasonic range. For example, the vibrational motion of cooling element 120 may be at the frequencies described for in-phase vibration. The structural resonant frequency of cooling element 120 is within ten percent of the acoustic resonant frequency of cooling system 100. In some embodiments, the structural resonant frequency of cooling element 120 is within five percent of the acoustic resonant frequency of cooling system 100. In some embodiments, the structural resonant frequency of cooling element 120 is within three percent of the acoustic resonant frequency of cooling system 100. Consequently, efficiency and flow rate may be enhanced. However, other frequencies may be used.

Fluid driven toward heat-generating structure 102 for out-of-phase vibration may move substantially normal (perpendicular) to the top surface of heat-generating structure 102, in a manner analogous to that described above for in-phase operation. Similarly, chimneys or other ducting (not shown) at the edges of cooling system 100 allow fluid to be carried away from heat-generating structure 102. In other embodiments, heated fluid may be transferred further from heat-generating structure 102 in another manner. The fluid may exchange the heat transferred from heat-generating structure 102 to another structure or to the ambient environment. Thus, fluid at the distal side of top plate 110 may remain relatively cool, allowing for the additional extraction of heat. In some embodiments, fluid is circulated, returning to distal side of top plate 110 after cooling. In other embodiments, heated fluid is carried away and replaced by new fluid at the distal side of cooling element 120. As a result, heat-generating structure 102 may be cooled.

Using the cooling system 100 actuated for in-phase vibration or out-of-phase vibration, fluid drawn in through vent 112 and driven through orifices 132 may efficiently dissipate heat from heat-generating structure 102. Because fluid impinges upon the heat-generating structure with sufficient speed (e.g. at least thirty meters per second) and in some embodiments substantially normal to the heat-generating structure, the boundary layer of fluid at the heat-generating structure may be thinned and/or partially removed. Consequently, heat transfer between heat-generating structure 102 and the moving fluid is improved. Because the heat-generating structure is more efficiently cooled, the corresponding integrated circuit may be run at higher speed and/or power for longer times. For example, if the heat-generating structure corresponds to a high-speed processor, such a processor may be run for longer times before throttling. Thus, performance of a device utilizing cooling system 100 may be improved. Further, cooling system 100 may be a MEMS device. Consequently, cooling systems 100 may be suitable for use in smaller and/or mobile devices, such as smart phones, other mobile phones, virtual reality headsets, tablets, two-in-one computers, wearables and handheld games, in which limited space is available. Performance of such devices may thus be improved. Because cooling element 120 may be vibrated at frequencies of 15 kHz or more, users may not hear any noise associated with actuation of cooling elements. If driven at or near structural and/or acoustic resonant frequencies, the power used in operating cooling systems may be significantly reduced. Cooling element 120 does not physically contact top plate 110 or orifice plate 130 during vibration. Thus, resonance of cooling element 120 may be more readily maintained. More specifically, physical contact between cooling element 120 and other structures disturbs the resonance conditions for cooling element 120. Disturbing these conditions may drive cooling element 120 out of resonance. Thus, additional power would need to be used to maintain actuation of cooling element 120. Further, the flow of fluid driven by cooling element 120 may decrease. These issues are avoided through the use of pressure differentials and fluid flow as discussed above. The benefits of improved, quiet cooling may be achieved with limited additional power. Further, out-of-phase vibration of cooling element 120 allows the position of the center of mass of cooling element 100 to remain more stable. Although a torque is exerted on cooling element 120, the force due to the motion of the center of mass is reduced or eliminated. As a result, vibrations due to the motion of cooling element 120 may be reduced. Moreover, efficiency of cooling system 100 may be improved through the use of out-of-phase vibrational motion for the two sides of cooling element 120. For out-of-phase vibration of cantilevered arms 121, vibrations through cooling system 100 may also be reduced. Consequently, performance of devices incorporating the cooling system 100 may be improved. Further, cooling system 100 may be usable in other applications (e.g. with or without heat-generating structure 102) in which high fluid flows and/or velocities are desired.

FIG. 1F depicts and embodiment of active cooling system 100' including a top centrally anchored cooling element. Cooling system 100' is analogous to cooling system 100. Consequently, analogous components have similar labels. For example, cooling system 100' is used in conjunction with heat-generating structure 102 and integrated circuit 103, which are analogous to heat-generating structure 102 and integrated circuit 103.

Cooling system 100' includes support structure 170', top plate 110' having vents 112', cooling element 120, orifice plate 130 including orifices 132, top chamber 140' having a gap, bottom chamber 150 having a gap and anchor 160 that are analogous to support structure 170, top plate 110 having vent 112, cooling element 120, orifice plate 130 including orifices 132, top chamber 140 having gap 142, bottom chamber 150 having gap 152 and anchor 160, respectively, of FIGS. 1A-1E. Thus, cooling element 120 is centrally supported by anchor 160 such that at least a portion of the perimeter of cooling element 120 is free to vibrate. In some embodiments, anchor 160 extends along the axis of cooling element 120 (e.g. in a manner analogous to anchor 360A and/or 360B). In other embodiments, anchor 160 is only near the center portion of cooling element 120 (e.g. analogous to anchor 360C and/or 360D). Cooling element 120 includes an anchored region 122 and cantilevered arms 121 analogous to anchored region 122 and cantilevered arms 121, respectively of cooling element 120 depicted in FIGS. 1A-1E. Cantilevered arms 121 of cooling element 120 may be driven in-phase and/or driven out-of-phase.

Anchor 160 supports cooling element 120 from above. Thus, cooling element 120 is suspended from anchor 160. Anchor 160 is suspended from top plate 110'. Top plate 110' includes vent 113. Vents 112' on the sides of anchor 160 provide a path for fluid to flow into sides of chamber 140'.

As discussed above with respect to cooling system 100, cooling element 120 may be driven to vibrate at or near the structural resonant frequency of cooling element 120. Further, the structural resonant frequency of cooling element 120 may be configured to align with the acoustic resonance of the chamber 140'/150. The structural and acoustic resonant frequencies are generally chosen to be in the ultrasonic range. For example, the vibrational motion of cooling element 120 may be at the frequencies described with respect to cooling system 100. Consequently, efficiency and flow rate may be enhanced. However, other frequencies may be used.

Cooling system 100' operates in an analogous manner to cooling system 100. Cooling system 100' thus shares the benefits of cooling system 100. Thus, performance of a device employing cooling system 100' may be improved. The use of cooling element 120 configured in a manner analogous to cooling element 120 may improve efficiency and reliability. In addition, suspending cooling element 120 from anchor 160 may further enhance performance. In particular, vibrations in cooling system 100' that may affect other cooling cells (not shown), may be reduced. For example, less vibration may be induced in top plate 110' due to the motion of cooling element 120. Consequently, cross talk between cooling system 100' and other cooling systems (e.g. other cells) or other portions of the device incorporating cooling system 100' may be reduced. Thus, performance may be enhanced.

As discussed above, cooling systems 100 and 100' may cool heat-generating structure 102 (and thus integrated circuit 103) using jets of fluid exiting orifices 132 and impinging on heat generating structure 102. However, cooling systems 100 and/or 100' may have an additional mechanism for cooling heat-generating structure. Cooling systems 100 and/or 100' are thermally coupled to heat-generating structure 102 via support structure 170 such that heat may be transferred from heat-generating structure 102 to cooling system 100 via conduction. For example, pedestal 172 may be made from thermally conductive materials. Pedestal 172 may also be joined to heat-generating structure using a highly thermally conductive mechanism, such as a thermally conductive epoxy. Similarly, pedestal 172 may have a thermal mass that is relatively large (e.g. a significant fraction of or greater than) compared to the thermal mass of heat-generating structure 102. For example, pedestal 172 may include or consist of high thermal capacity material(s) (e.g. steels and aluminum alloys) and/or high thermal conductivity materials (e.g. copper and aluminum). Pedestal 172 may also contact heat-generating structure 102 over a wide area. Pedestal 172 may range in size from approximately the size of anchor 160 to across the cooling cell 100 and/or 100' or across an entire tile formed of multiple cooling cells. For example, pedestal 172 may extend out of the plane of the page across the entire cooling system 100 or across multiple cooling systems. Further, cooling element 120 is thermally coupled to support structure 170 and/or 170' via anchor 160 and/or top plate 110', respectively. Thus, heat may be conducted from heat-generating structure 102 to cooling element 120 and the remainder of support structure 170 and/or 170', respectively. Thus, cooling system(s) 100 and/or 100' may act as heat sinks for heat-generating structure 102 and integrated circuit 103. Further, because of its shape (e.g. large surface area), cooling element 120 may function as a fin.

In addition, cooling system(s) 100 and/or 100' are active cooling systems. Consequently, cooling system(s) 100 and/or 100' may be considered active heat sinks in some embodiments. More specifically, cooling element 120 undergoes vibrational motion. In addition to driving fluid through orifices 132, the vibrational motion drives fluid into chambers 140/150 and 140'/150, through chambers 140/150 and 140'/150, and past cooling elements 120. Because fluid is driven past cooling element 120 and through support structure(s) 170 and/or 170', heat in cooling element 120 and through support structure(s) 170 and/or 170' is transferred to the fluid. Consequently, in addition to or instead of transferring heat directly from heat-generating structure 102, fluid can remove heat from cooling element 120 and/or support structure 170/170'.

Moreover, cooling systems 100 and 100' drive fluid such that fluid exiting orifices 132 has a high speed of at least thirty meters per second. In some embodiments, the fluid exiting orifices 132 has a speed of at least forty-five meters per second. In some embodiments, the fluid exits orifices 132 at speeds of at least sixty meters per second. Other speeds may be possible in some embodiments. Fluid exiting orifices 132 has a high speed in part because the fluid traveling through chambers 140/150 has a high flow rate. In some embodiments, for example, the flow rate through chambers 140/150 may be at least 0.05 cubic feet per minute (cfm). In some embodiments, the flow rate through chambers 140/150 is at least 0.1 cfm. Other (i.e. higher or lower) flow rates are possible. The relatively high flow rates that may be driven through cooling system(s) 100 and/or 100' efficiently remove heat from cooling elements 120 and support structure(s) 170 and/or 170'.

Figure 2A:
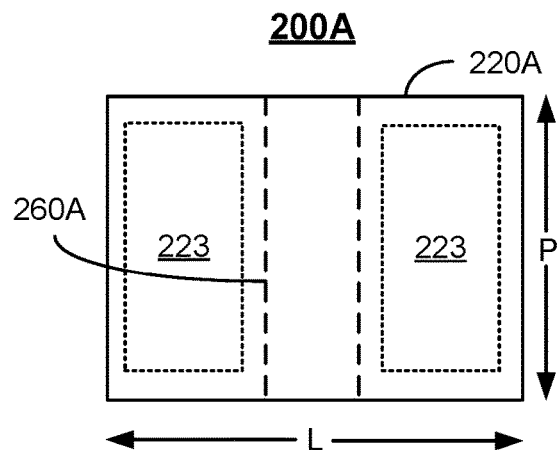
FIGS. 2A-2B depict embodiments of cooling elements usable in active cooling systems including centrally anchored cooling elements.
Figure 2B:
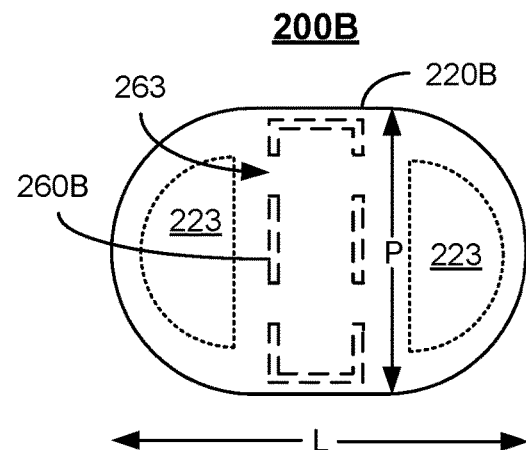

FIGS. 2A-2B depict plan views of embodiments of cooling systems 200A and 200B analogous to active cooling systems such as cooling system 100. FIGS. 2A and 2B are not to scale. For simplicity, only portions of cooling elements 220A and 220B and anchors 260A and 260B, respectively, are shown. Cooling elements 220A and 220B are analogous to cooling element 120. Thus, the sizes and/or materials used for cooling elements 220A and/or 220B may be analogous to those for cooling element 120. Anchors (support structures) 260A and 260B are analogous to anchor 160 and are indicated by dashed lines.

For cooling elements 220A and 220B, anchors 260A and 260B are centrally located and extend along a central axis of cooling elements 220A and 220B, respectively. Thus, the cantilevered portions that are actuated to vibrate are to the right and left of anchors 260A and 260B. In some embodiments, cooling element(s) 220A and/or 220B are continuous structures, two portions of which are actuated (e.g. the cantilevered portions outside of anchors 260A and 260B). In some embodiments, cooling element(s) 220A and/or 220B include separate cantilevered portions each of which is attached to the anchors 260A and 260B, respectively, and actuated. Cantilevered portions of cooling elements 220A and 220B may thus be configured to vibrate in a manner analogous to the wings of a butterfly (in-phase) or to a seesaw (out-of-phase). In FIGS. 2A and 2B, L is the length of the cooling element, analogous to that depicted in FIGS. 1A-1E. Also in FIGS. 2A and 2B, the depth, P, of cooling elements 220A and 220B is indicated.

Also shown by dotted lines in FIGS. 2A-2B are piezoelectric 223. Piezoelectric 223 is used to actuate cooling elements 220A and 220B. In some embodiments, piezoelectric 223 may be located in another region and/or have a different configuration. Although described in the context of a piezoelectric, another mechanism for actuating cooling elements 220A and 220B can be utilized. Such other mechanisms may be at the locations of piezoelectric 223 or may be located elsewhere. In cooling element 220A, piezoelectric 223 may be affixed to cantilevered portions or may be integrated into cooling element 220A. Further, although piezoelectric 223 is shown as having particular shapes and sizes in FIGS. 2A and 2B, other configurations may be used.

In the embodiment shown in FIG. 2A, anchor 260A extends the entire depth of cooling element 220A. Thus, a portion of the perimeter of cooling element 220A is pinned. The unpinned portions of the perimeter of cooling element 220A are part of the cantilevered sections that undergo vibrational motion. In other embodiments, anchor need not extend the entire length of the central axis. In such embodiments, the entire perimeter of the cooling element is unpinned. However, such a cooling element still has cantilevered sections configured to vibrate in a manner described herein. For example, in FIG. 2B, anchor 260B does not extend to the perimeter of cooling element 220B. Thus, the perimeter of cooling element 220B is unpinned. However, anchor 260B still extends along the central axis of cooling element 220B. Cooling element 220B is still actuated such that cantilevered portions vibrate (e.g. analogous to the wings of a butterfly).

Although cooling element 220A is depicted as rectangular, cooling elements may have another shape. In some embodiments, corners of cooling element 220A may be rounded. Cooling element 220B of FIG. 2B has rounded cantilevered sections. Other shapes are possible. In the embodiment shown in FIG. 2B, anchor 260B is hollow and includes apertures 263. In some embodiments, cooling element 220B has aperture(s) in the region of anchor 260B. In some embodiments, cooling element 220B includes multiple portions such that aperture(s) exist in the region of anchor 260B. As a result, fluid may be drawn through cooling element 220B and through anchor 260B. Thus, cooling element 220B may be used in place of a top plate, such as top plate 110. In such embodiments, apertures in cooling element 220B and apertures 263 may function in an analogous manner to vent 112. Further, although cooling elements 200A and 200B are depicted as being supported in a central region, in some embodiments, one cantilevered section of the cooling element 220A and/or 220B might be omitted. In such embodiments, cooling element 220A and/or 220B may be considered to be supported, or anchored, at or near one edge, while at least part of at least the opposing edge is free to undergo vibrational motion. In some such embodiments, the cooling element 220A and/or 220B may include a single cantilevered section that undergoes vibrational motion.

Figure 3A:
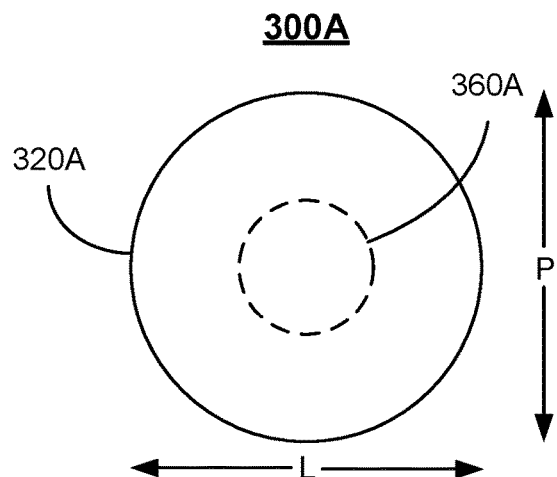
FIGS. 3A-3B depict embodiments of cooling elements usable in active cooling systems including centrally anchored cooling elements.
Figure 3B:
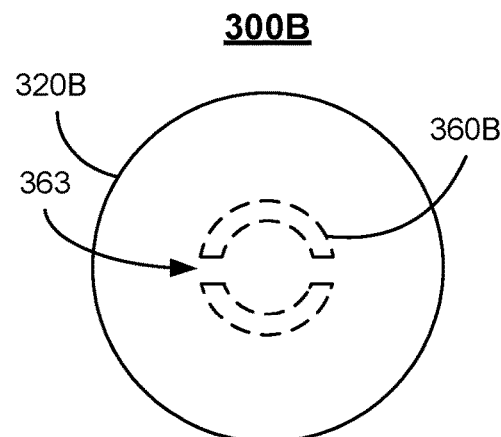

FIGS. 3A-3B depict plan views of embodiments of cooling systems 300A and 300B analogous to active cooling systems such as cooling system 100. FIGS. 3A and 3B are not to scale. For simplicity, only cooling elements 320A and 320B and anchors 360A and 360B, respectively, are shown. Cooling elements 320A and 320B are analogous to cooling element 120. Thus, the sizes and/or materials used for cooling elements 320A and/or 320B may be analogous to those for cooling element 120. Anchors 360A and 360B are analogous to anchor 160 and are indicated by dashed lines.

For cooling elements 320A and 320B, anchors 360A and 360B, respectively, are limited to a central region of cooling elements 320A and 320B, respectively. Thus, the regions surrounding anchors 360A and 360B undergo vibrational motion. Cooling elements 320A and 320B may thus be configured to vibrate in a manner analogous to a jellyfish or similar to the opening/closing of an umbrella. In some embodiments, the entire perimeter of cooling elements 320A and 320B vibrate in phase (e.g. all move up or down together). In other embodiments, portions of the perimeter of cooling elements 320A and 320B vibrate out of phase. In FIGS. 3A and 3B, L is the length (e.g. diameter) of the cooling element, analogous to that depicted in FIGS. 1A-1E. Although cooling elements 320A and 320B are depicted as circular, cooling elements may have another shape. Further, a piezoelectric (not shown in FIGS. 3A-3B) and/or other mechanism may be used to drive the vibrational motion of cooling elements 320A and 320B.

In the embodiment shown in FIG. 3B, the anchor 360B is hollow and has apertures 363. In some embodiments, cooling element 320B has aperture(s) in the region of anchor 360B. In some embodiments, cooling element 320B includes multiple portions such that aperture(s) exist in the region of anchor 360B. As a result, fluid may be drawn through cooling element 320B and through anchor 360B. The fluid may exit through apertures 363. Thus, cooling element 320B may be used in place of a top plate, such as top plate 110. In such embodiments, apertures in cooling element 320B and apertures 363 may function in an analogous manner to vent 112.

Cooling systems such as cooling system 100 can utilize cooling element(s) 220A, 220B, 320A, 320B and/or analogous cooling elements. Such cooling systems may also share the benefits of cooling system 100. Cooling systems using cooling element(s) 220A, 220B, 320A, 320B and/or analogous cooling elements may more efficiently drive fluid toward heat-generating structures at high speeds. Consequently, heat transfer between the heat-generating structure and the moving fluid is improved. Because the heat-generating structure is more efficiently cooled, the corresponding device may exhibit improved operation, such as running at higher speed and/or power for longer times. Cooling systems employing cooling element(s) 220A, 220B, 320A, 320B and/or analogous cooling elements may be suitable for use in smaller and/or mobile devices in which limited space is available. Performance of such devices may thus be improved. Because cooling element(s) 220A, 220B, 320A, 320B and/or analogous cooling elements may be vibrated at frequencies of 15 kHz or more, users may not hear any noise associated with actuation of cooling elements. If driven at or near the acoustic and/or structural resonance frequencies for the cooling element(s) 220A, 220B, 320A, 320B and/or analogous cooling elements, the power used in operating cooling systems may be significantly reduced. Cooling element(s) 220A, 220B, 320A, 320B and/or analogous cooling elements may not physically contact the plates during use, allowing resonance to be more readily maintained. The benefits of improved, quiet cooling may be achieved with limited additional power. Consequently, performance of devices incorporating the cooling element(s) 220A, 220B, 320A, 320B and/or analogous cooling elements may be improved.

In some embodiments, the cooling element may be anchored at one or more edges instead of at its center. For example, FIGS. 4A-4C depict an embodiment of cooling system 400 in which the edges of the cooling elements are anchored.

Figure 4A:
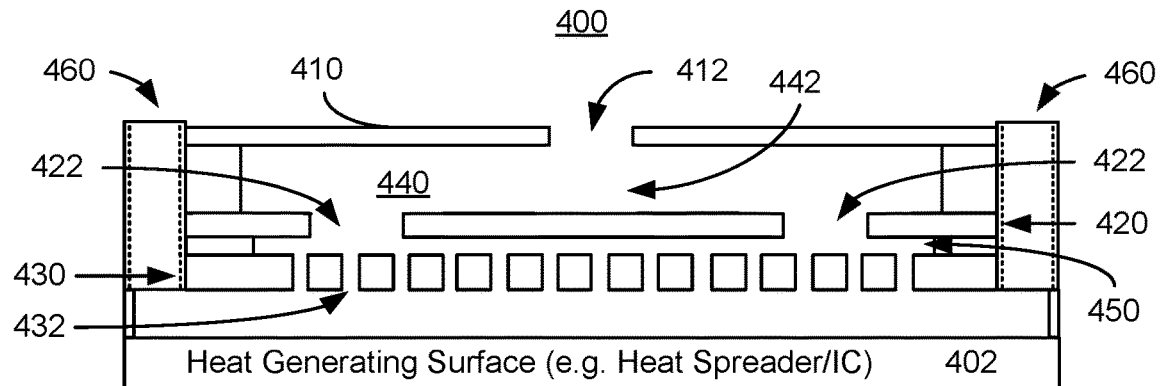
FIGS. 4A-4C are diagrams depicting an embodiment of an active cooling system.
Figure 4B:
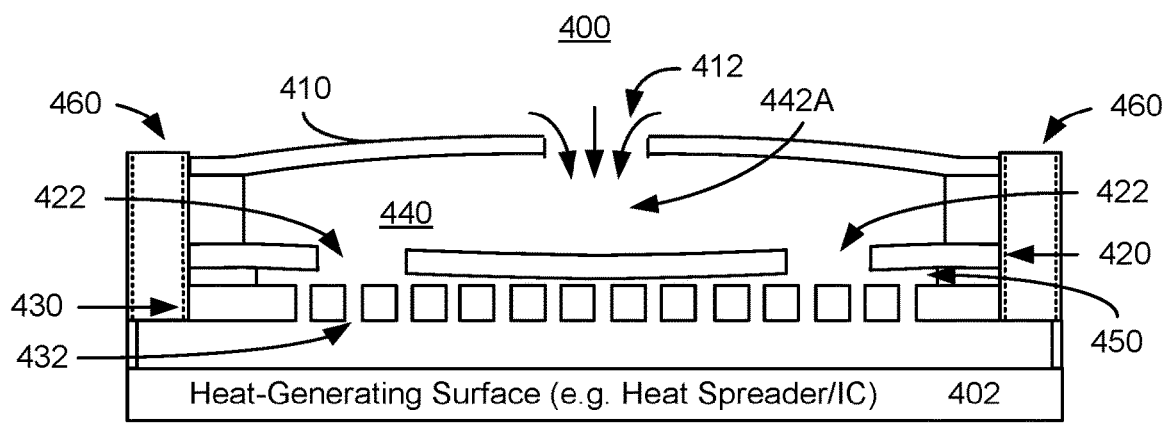
Figure 4C:
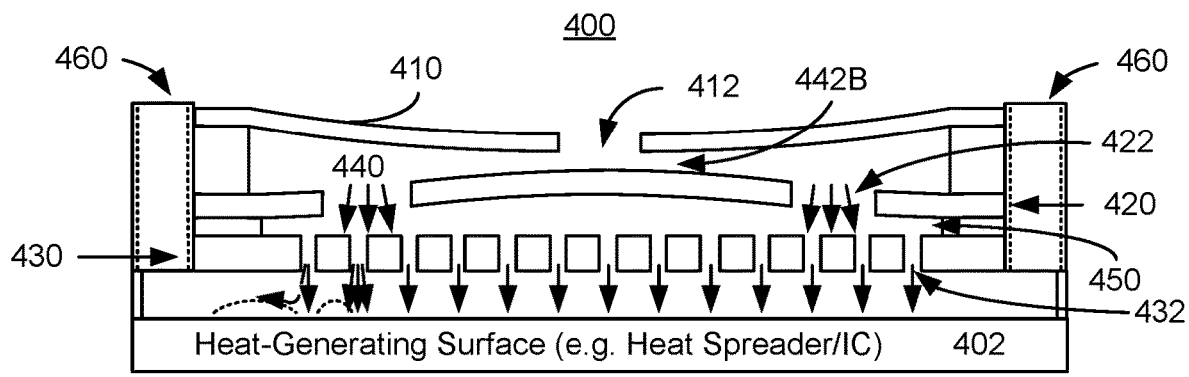

FIGS. 4A-4C are diagrams depicting an exemplary embodiment of active cooling system 400 usable with a heat-generating structure 402. For clarity, only certain components are shown and FIGS. 4A-4C are not to scale. Cooling system 400 is used in connection with a heat-generating structure 402. Although shown as symmetric, cooling system 400 need not be symmetric.

Cooling system 400 includes cooling elements 410 and 420. Cooling system 400 also includes orifice plate 430 having orifices 432 therein, top chamber 440 and bottom chamber 450 that may be analogous to orifice plate 130 having orifices 132 therein, top chamber 140 and bottom chamber 150. Also shown are optional chimneys 460 used to direct fluid. In some embodiments, cooling system 400 may include pedestal(s) (not shown) that are analogous to pedestal 172 and utilized to thermally couple cooling system 400 to heat-generating structure 402 via conduction. In at least some such embodiments, such a pedestal may be near the edges of the chamber(s) 440/450.

Cooling element 410 has a first side distal from heat-generating structure 402 and a second side proximate to heat-generating structure 402. The first side of cooling element 410 is the top of cooling element 410 and the second side is the bottom of cooling element 410. Cooling element 410 also has a passive vent 412 therein. In the embodiment shown, passive vent 412 is a centrally located aperture in cooling element 410. In other embodiments, passive vent 412 may be located elsewhere. For example, passive vent 412 may be closer to one of the edges of cooling element 410. Passive vent 412 may have a circular, rectangular or other shaped footprint. Although one passive vent 412 is shown, multiple passive vents might be used.

Cooling element 420 is between cooling element 410 and heat-generating structure 402. In the embodiment shown, cooling element 420 is also between cooling element 410 and orifice plate 430. Cooling elements 410 and 420 are separated by gap 442 and form a top chamber 440. A bottom chamber 450 is formed between cooling element 420 and orifice plate 430. Cooling element 420 also has active vents 422 therein. In the embodiment shown, active vents 422 are apertures located away from the central region of cooling element 420. In other embodiments, active vents 422 may be located elsewhere. For example, an active vent may be centrally located in cooling element 420. Although two active vents 422 are shown, another number (e.g. one, three, etc.) might be present. In some embodiments, active vents 422 are positioned such that the active vents 422 are not aligned with passive vent 412. Active vents 422 may have circular, rectangular or other shaped footprints. In some embodiments, a single cooling element 410 or 420 which does not include a vent may be used in lieu of two cooling elements.

In some embodiments, cooling system 400 includes chimneys 460. Chimneys 460 provide a return path for heated fluid to flow away from heat-generating structure 402. In some embodiments, chimneys 460 return fluid to the side of cooling element 410 distal from heat-generating structure 402. In the embodiment shown, chimneys 460 direct heated fluid substantially perpendicular to heat-generating structure 402 and toward the side of cooling element 410 distal from heat-generating structure 402. In other embodiments, chimneys 460 may be omitted or configured in another manner. For example, chimneys may instead directed fluid away from heat-generating structure 402 in a direction parallel to heat-generating structure 402 or perpendicular to heat-generating structure 402 but opposite to the direction shown (e.g. toward the bottom of the page). If multiple cooling systems 400 are provided in an array, each cooling system 400 may include chimneys, only cooling systems 400 at the edges may include chimneys, other ducting may be provided at the edges or other locations in the array to provide a path for heated fluid to flow and/or other mechanisms may be used to allow heated fluid to be removed from the region proximate to heat-generating structure 402.

FIG. 4A depicts cooling system 400 in a neutral position. Thus, cooling elements 410 and 420 are shown as substantially flat. In operation, piezoelectric cooling elements 410 and 420 are actuated to vibrate between positions shown in FIGS. 4B and 4C. Piezoelectric cooling elements 410 and 420 are, therefore, piezoelectric actuators. Operation of cooling system 400 is described in the context of FIGS. 4B and 4C. Referring to FIG. 4B, piezoelectric cooling element 410 has been actuated to move away from (deform to be convex) heat-generating structure 402, while piezoelectric cooling element 420 has been actuated to move toward (deform to be concave) heat-generating structure 402. This configuration is referred to as the suction arrangement. Because of the vibrational motion of piezoelectric cooling elements 410 and 420, gap 442 has increased in size and is shown as gap 442A. For example, in some embodiments, gap 442 has a height of at least ten and not more than twenty micrometers in the neutral position (FIG. 4A). Gap 442A may have a height of at least twenty and not more than thirty micrometers in the suction arrangement (FIG. 4B). Thus, top chamber 440 has increased in volume, while bottom chamber 450 has decreased in volume. In the suction arrangement, the flow resistance of passive vent 412 (passive suction flow resistance) is low. Consequently, the pressure at passive vent 412 is low. In contrast, the flow resistance of active vent 422 (active suction flow resistance) is high. Consequently, the pressure at active vent 422 is high. Because of the low passive suction flow resistance, fluid is drawn into top chamber 440 through passive vent 412. This is shown by arrows in FIG. 4B. However, fluid does not flow out of (or flows out to a limited extent) active vent 422 because of the high passive suction flow resistance. However, active vent 422 is not physically closed in this configuration. For example, active vent 422 is not in contact with orifice plate 430 in the suction arrangement.

FIG. 4C depicts an expulsion arrangement. Piezoelectric cooling element 410 has been actuated to move toward (deform to be concave) heat-generating structure 402, while piezoelectric cooling element 420 has been actuated to move away from (deform to be convex) heat-generating structure 402. Because of the vibrational motion of piezoelectric cooling elements 410 and 420, gap 442 has decreased in size and is shown as gap 442B. For example, in some embodiments, gap 442 has a height of at least ten and not more than twenty micrometers in the neutral position (FIG. 4A). Gap 442B has a height of at least five and not more than ten micrometers in the expulsion arrangement (FIG. 4C). Thus, top chamber 440 has decreased in volume, while bottom chamber 450 has increased in volume. In the expulsion arrangement, the flow resistance of passive vent 412 (passive expulsion flow resistance) is high. Consequently, the pressure at passive vent 412 is high. In contrast, the flow resistance of active vent 422 (active expulsion flow resistance) is low. Consequently, the pressure at active vent 422 is low. Because of the low active expulsion flow resistance, fluid is expelled from top chamber 440 through active vent 422, into bottom chamber 450 and through orifices 432. This is shown by arrows in FIG. 4C. However, fluid does not flow out of (or flows out to a limited extent) passive vent 412 because of the high passive expulsion flow resistance. Thus, passive vent 412 is considered closed and active vent 422 is considered open in the expulsion arrangement. However passive vent 412 is not physically closed in this configuration. For example, passive vent 412 is not in contact with cooling element 420 in the expulsion arrangement. Gap 442B does not have a zero length.

Virtual valves may be considered to be formed at or near active vent 422 and passive vent 412. A virtual valve has a high, but not infinite, flow resistance when closed. Thus, a virtual valve does not physically block flow but instead uses a high flow resistance or high pressure to throttle or prevent flow. A virtual valve has a significantly lower flow resistance or pressure when open, allowing flow. In some embodiments, the ratio of flow resistances or pressures between closed and open for a virtual valve is at least three and not more than ten. Thus, active vent 422 and its virtual valve ("active virtual valve") are considered closed in the suction arrangement because the flow resistance is sufficiently high that little or no fluid flows through active vent 422 in the suction arrangement. Passive vent 412 and its virtual valve ("passive virtual valve") are considered open in the suction arrangement because the pressure or flow resistance is sufficiently low to allow fluid to be drawn in to top chamber 440 through passive vent 412. In contrast, active vent 422 and active virtual valve are considered open in the expulsion arrangement because the pressure or flow resistance is sufficiently low to allow fluid to flow through active vent 422 and be driven out of orifices 432. Passive vent 412 and passive virtual valve are considered closed in the expulsion arrangement because the pressure or flow resistance is sufficiently high that little to no fluid is drawn through passive vent 412 in the expulsion arrangement.

Due to the vibrational motion of cooling elements 410 and 420 (and the attendant decrease in gap 442A/442B from FIG. 4B to FIG. 4C), the fluid is drawn in to top chamber 440 and through orifices 432. The motion of the fluid is shown by arrows through orifices 432. The fluid may spread as it travels away from orifice plate 420, as shown by dashed lines and arrows for some orifices 432 in FIG. 4C. The fluid deflects off of heat-generating structure 402 and travels along the channel between heat-generating structure 402 and orifice plate 430.

The motion between the positions shown in FIGS. 4B and 4C may be repeated. Thus, piezoelectric cooling elements 410 and 420 vibrate, drawing fluid through passive vent 412 from the distal side of cooling element 410, into top chamber 440, out of chamber 440 through active vent 422 and pushing the fluid through orifices 432 and toward heat-generating structure 402. In some embodiments, the frequency/frequencies of vibration of cooling elements 410 and/or 420 are analogous to those of cooling element 120. Further, in some embodiments, piezoelectric cooling element(s) 410 and/or 420 may be driven at or near the resonant frequency. The resonant frequencies of piezoelectric cooling element(s) 410 and 420 may also be desired to be close. In some embodiments, the resonant frequencies of piezoelectric cooling element(s) 410 and 420 are desired to be within one hundred Hertz. In some embodiments, feedback is used to maintain piezoelectric cooling element(s) 410 and/or 420 at or near resonance. The resonant frequencies of cooling elements 410 and/or 420 may be closely matched to the acoustic resonant frequencies of chamber(s) 440 and/or 450. In some embodiments, the speed at which the fluid impinges on heat-generating structure 402 is in the ranges described herein for cooling system 100.

As indicated in FIG. 4C, the fluid driven toward heat-generating structure 402 may move substantially normal (perpendicular) to the top surface of heat-generating structure 402. In other embodiments, the fluid motion may have a nonzero acute angle with respect to the normal to the top surface of heat-generating structure 402. In either case, the fluid may thin and/or form apertures in the boundary layer of fluid at heat-generating structure 402. The boundary layer in one case is indicated by the curved dotted lines at the top surface of heat-generating structure 402 in FIG. 4C. As a result, transfer of heat from heat-generating structure 402 may be improved. The fluid deflects off of heat-generating structure 402, traveling along the surface of heat-generating structure 402. In some embodiments, the fluid moves in a direction substantially parallel to the top of heat-generating structure 402. Thus, heat from heat-generating structure 402 may be extracted by the fluid. The fluid may exit the region between orifice plate 430 and heat-generating structure 402 at the edges of cooling system 400. In the embodiment shown, chimneys 460 at the edges of cooling system 400 allow fluid to be carried away from heat-generating structure 402. In other embodiments, heated fluid may be transferred further from heat-generating structure 402 in another manner. The fluid may return to the distal side of cooling elements 410 where the fluid may exchange the heat transferred from heat-generating structure 402 to another structure or to the ambient environment. The fluid may then be circulated through cooling system 400 to extract additional heat. In other embodiments, heated fluid is carried away and replaced by new fluid at the distal side of cooling element 410. As a result, heat-generating structure 402 may be cooled.

Opening and closing of passive vent 412 (passive virtual valve) and active vent 422 (active virtual valve) to draw fluid into chamber 450 and expel fluid through orifices 432 is based upon dynamic changes to flow resistance. In some embodiments, the ratio of active suction flow resistance to active expulsion flow resistance is at least three. In some such embodiments, the ratio of active suction flow resistance to active expulsion flow resistance is not more than ten. In some embodiments, the ratio of passive expulsion flow resistance to passive suction flow resistance is at least three. In some such embodiments, the ratio of passive expulsion flow resistance to passive suction flow resistance is not more than ten. Thus, virtual valves corresponding to vents 410 and/or 420 may be opened and closed. These ratios of pressures may be considered to be due to the change in size of gap 442/442A/442B (e.g. five through thirty micrometers in some embodiments). In some embodiments, the difference in pressure between being open and closed is 0.1 atmosphere through 0.2 atmosphere. For example, the pressure at passive vent 412 in the suction arrangement may be at least 0.1 atmosphere and not more than 0.2 atmosphere less than the pressure at passive vent 412 in the expulsion arrangement. Similarly, the pressure at active vent 422 in the expulsion arrangement may be at least 0.1 atmosphere and not more than 0.2 atmosphere less than the pressure at active vent 422 in the suction arrangement.

Using the cooling system 400, fluid may be drawn in through passive vent 412 (in the suction arrangement) and driven through active vent 422 and orifices 432 (in the expulsion arrangement). Thus, the fluid may efficiently dissipate heat from heat-generating structure 402 in a manner analogous to the fluid driven by cooling system 100. Thus, performance of a device utilizing cooling system 400 may be improved. Further, cooling system 400 may be a MEMS device. Thus, cooling system 400 may small-having a total height not exceeding five hundred micrometers. Consequently, cooling systems 400 may be suitable for use in mobile devices, such as smart phones, other mobile phones, virtual reality headsets, tablets, two-in-one computers, wearables and handheld games, in which limited space is available. Active cooling system 400 may also be used in other compute devices. Because piezoelectric cooling element(s) 410 and/or 420 may be vibrated at ultrasonic frequencies, users may not hear any noise associated with actuation of cooling elements. If driven at or near resonance frequency for the first and second piezoelectric cooling element(s), the power used in operating cooling systems may be significantly reduced.

Figure 5A:
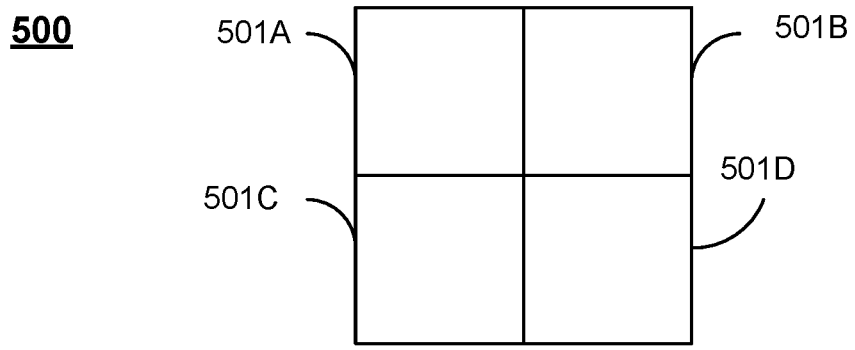
FIGS. 5A-5E depict an embodiment of an active cooling system formed in a tile.
Figure 5B:
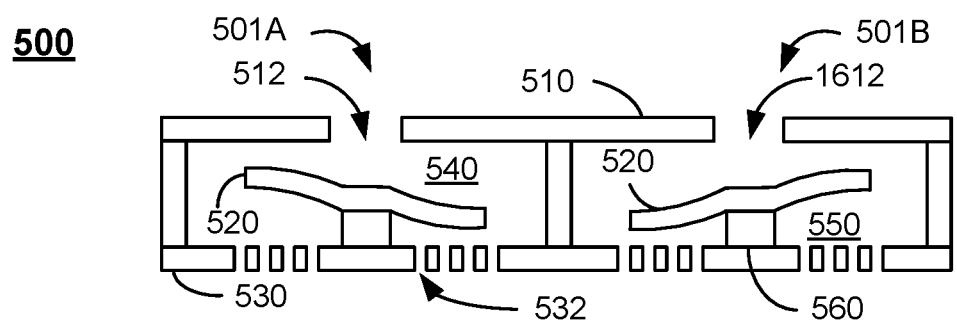
Figure 5C:
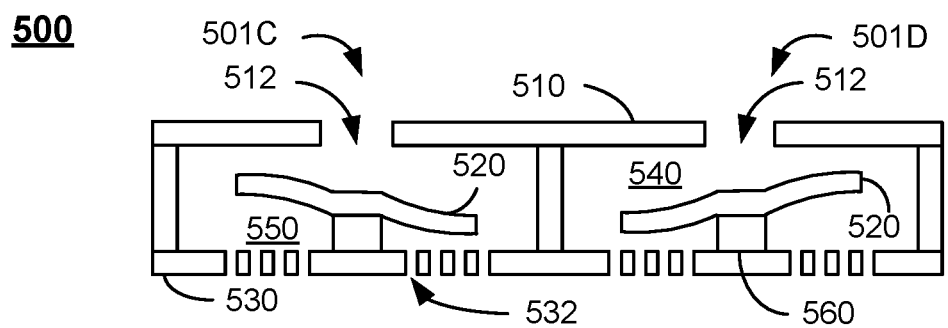
Figure 5D:
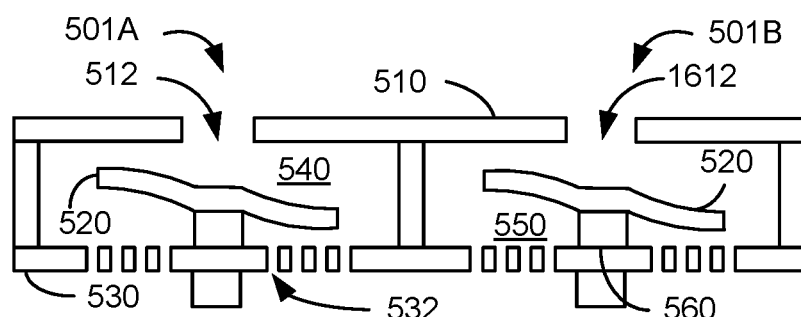
Figure 5E:
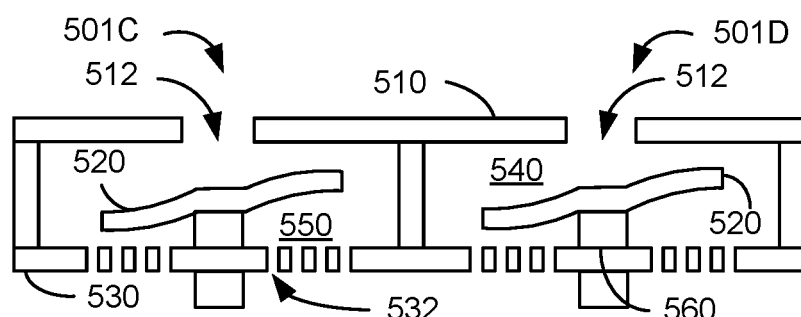

FIGS. 5A-5E depict an embodiment of active cooling system 500 including multiple cooling cells configured as a tile, or array. FIG. 5A depicts a top view, while FIGS. 5B-5E depict side views. FIGS. 5A-5E are not to scale. Cooling system 500 includes four cooling cells 501A, 501B, 501C and 501D (collectively or generically 501), which are analogous to one or more of cooling systems described herein. More specifically, cooling cells 501 are analogous to cooling system 100. In some embodiments, cooling cell(s) 501 may be analogous to cooling system 400 and/or another cooling system. Although four cooling cells 501 in a 2×2 configuration are shown, in some embodiments another number and/or another configuration of cooling cells 501 might be employed. In the embodiment shown, cooling cells 501 include shared top plate 510 having apertures 512, cooling elements 520, shared orifice plate 530 including orifices 532, top chambers 540, bottom chambers 550 and anchors (support structures) 560 that are analogous to top plate 110 having apertures 112, cooling element 120, orifice plate 130 having orifices 132, top chamber 140, bottom chamber 150 and anchor 160. In some embodiments, cooling cells 501 may be fabricated together and separated, for example by cutting through top plate 510 and orifice plate 530. Cooling elements 520 are driven out-of-phase (i.e. in a manner analogous to a seesaw). Further, as can be seen in FIGS. 5B-5C and FIGS. 5D-5E cooling element 520 in one cell is driven out-of-phase with cooling element(s) 520 in adjacent cell(s). In FIGS. 5B-5C, cooling elements 520 in a row are driven out-of-phase. Thus, cooling element 520 in cell 501A is out-of-phase with cooling element 520 in cell 501B. Similarly, cooling element 520 in cell 501C is out-of-phase with cooling element 520 in cell 501D. In FIGS. 5D-5E, cooling elements 520 in a column are driven out-of-phase. Thus, cooling element 520 in cell 501A is out-of-phase with cooling element 520 in cell 501C. Similarly, cooling element 520 in cell 501B is out-of-phase with cooling element 520 in cell 501D. By driving cooling elements 520 out-of-phase, vibrations in cooling system 500 may be reduced.

Cooling cells 501 of cooling system 500 function in an analogous manner to cooling system(s) 100, 400, and/or an analogous cooling system. Consequently, the benefits described herein may be shared by cooling system 500. Because cooling elements in nearby cells are driven out-of-phase, vibrations in cooling system 500 may be reduced. Because multiple cooling cells 501 are used, cooling system 500 may enjoy enhanced cooling capabilities. Further, multiples of individual cooling cells 501 and/or cooling system 500 may be combined in various fashions to obtain the desired footprint of cooling cells.

Figure 6:
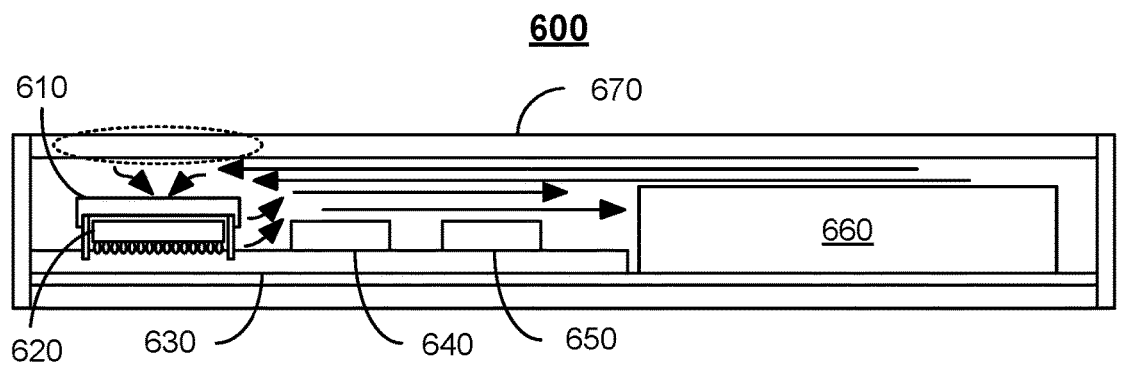
FIG. 6 depicts an embodiment of an active cooling system used in a mobile device.

FIG. 6 is a diagram depicting an embodiment of cooling system 610 used in a mobile device 600. Mobile device 600 may be a mobile phone (e.g. a smartphone), a tablet, a laptop computer, or other mobile device. In some embodiments, device 600 may be another device that is not mobile, such as a server system or other computing device. In some embodiments, mobile device 600 is thin. For example, in some embodiments, mobile device 600 has a thickness (height along the smallest dimension) of not more than twenty-five millimeters. In some embodiments, the thickness of mobile device 600 is not more than ten millimeters. In some such embodiments, the thickness of mobile device 600 is not more than eight millimeters. However, other thicknesses are possible. Cooling system 610 is analogous to cooling system(s) 100, 100', 200A, 200B, 300A, 300B, 400, and/or 500. Cooling system 610 may thus include cell(s), cooling element(s), orifice plate(s) having apertures therein, top plate(s), pedestal(s), and/or other components (not explicitly shown) that are analogous to cells and their components described herein. However, for clarity, such structures are not shown.

Heat-generating structure 620 is analogous to heat-generating structure 102, 402, and/or 103. In the embodiment shown, heat-generating structure 620 is an integrated circuit, such as a processor. Although not shown, a heat spreader or other mechanism for reducing localization of heating (i.e. hot spots) may be present and considered part of heat-generating structure 620. In general, such a heat spreader would be located between heat-generating structure 620 shown and cooling system 610. Heat-generating structure 620 is on a substrate 630, which may be a motherboard. Components 640, 650 and 660 are also shown. For example, components 640 and/or 650 might be other integrated circuits. Component 660 might be a battery or other constituent(s) of mobile device 600. Although not shown, internal and/or external temperature sensors as well as other components including but not limited to a heat spreader might be employed. Housing 670 is also shown. Housing 670 is closed. Thus, fluid used to by cooling system 610 circulates within housing 670. However, housing 670 might be open in other embodiments. Cooling system 610 is attached to a frame in proximity to component 620.

Cooling system 610 operates in a manner analogous to cooling systems described herein. As can be seen by arrows in FIG. 6, cooler fluid (e.g. air) near component 620 is drawn toward cooling system 610. Cooling system 610 drives fluid from its distal side (further from heat-generating component 620) to the proximal side (closer to heat-generating component 620). In the embodiment shown, fluid is driven toward heat-generating structure 620 (or a heat sink disposed between the component and cooling system 610). In some embodiments, fluid driven by cooling system 610 impinges on heat-generating structure 620, for example as shown in FIGS. 1B-1E and FIG. 4C. Heat from heat-generating structure 620 is transferred to the fluid. While cooling system is sufficiently cooler than heat-generating component 620 (e.g. is closer to room temperature/during at least transient operation of mobile device 600), heat is transferred primarily from heat-generating structure 620 to the fluid. Some heat may also be transferred from heat-generating structure 620 to cooling system 610 via conduction. In some embodiments, as cooling system 610 heats up during use (e.g. has a temperature that is closer to the temperature of heat-generating structure 620/during steady-state operation) heat is transferred primarily from heat-generating structure 620 to cooling system 610 via thermal conduction and from cooling system 610 to the fluid. Some heat may also be transferred from heat-generating structure 620 directly to the (warmed) fluid. The fluid exits the region from near the sides of component 620 carrying heat generated by component 620 away. The fluid traverses past other portions of device 600, such as components 640 and 650, allowing the fluid to cool. The cooler fluid returns to the region near cooling system 610.

Cooling system 610 may more efficiently and quietly cool component 620 at lower power. Thus, performance of component 610 may be improved. Additional cooling systems can be employed and/or cooling system 610 can be increased in size (e.g. by adding more cells). Larger and/or additional cooling systems can be used to transfer heat from additional portions of device 600, such as components 640, 650 and 660. Further, in some embodiments, cooling system 610 (or additional, analogous cooling system(s)) might be oriented perpendicular to what is shown. In such an embodiment, cooling system 610 may be used to drive fluid flow across components 620, 640, 650 and 660. Thus, heat may be more effectively transferred from heat-generating component 620 to the fluid, removed from the region near heat-generating component 620 and dissipated.

Because cooling system 610 can manage heat in the manner described herein, both the internal and external temperatures of mobile device 600 may be better controlled. For example, the coefficient of thermal spreading (CTS) of mobile device 600 may be improved. The CTS is related to the temperature of the external surfaces of mobile device 600. The CTS is given by:

$$CTS = (T_{ave} - T_{ambient})/T_{max} - T_{ambient})$$

Where: $T_{ave}$=Average temperature of the surface of the device;
$T_{max}$=Maximum temperature of the surface of the device;
$T_{ambient}$=Temperature of the surrounding environment;

Without sufficient removal of heat from a device, regions of the surface of the device near heat-generating components may undergo localized heating. This local heating can results in hot spots. Stated differently, regions of the surface of the device near components that generate significant amounts of heat may have a noticeably higher temperature than the remainder of the device. Thus, the average temperature of the surface of the device would be significantly lower than the maximum temperature at a hot spot on the surface. For example, the processor of a mobile phone, notebook, or laptop computer is often a significant source of heat. The higher the power consumed by the processor, the more difficult it becomes to adequately transfer heat from the processor. Hot spots can occur at the surface of the mobile phone (e.g. the display or the back cover). This difference in temperature between the hot spot and the remainder of the surface results in a larger difference between the maximum and average surface temperatures. Consequently, a lower CTS results, particularly for higher power consumption.

If mobile device 600 did not include cooling system 610, regions of housing 670 near heat-generating component 620 (e.g. a processor) could rise significantly in temperature. For example, the distance between the top of heat-generating structure 620 and the interior surface of housing 670 is generally small. As indicated above, for some mobile devices such as notebooks, this distance may be on the order of 0.5 millimeters. For mobile devices such as mobile phones (e.g. smartphones), the distance is smaller, such as approximately 0.3 millimeters. In such as case, heat radiating from the high-temperature heat-generating structure 620 would raise the local temperature of the interior surface of housing 670. Heat may also be transferred to the portions of housing 670 close to heat-generating structure 620 via other mechanisms, such as conduction and/or convection. Other regions far from heat-generating component 620 may be significantly cooler. Hot spots in proximity to heat-generating structure 620 may occur. Thus, without cooling system 610, mobile device 600 would have a lower CTS. This situation would be exacerbated if heat-generating component 620 consumed large amounts of power (e.g. at least five watts).

However, cooling system 610 allows for improved thermal management, reduced hot spots and/or a higher CTS. More specifically, heat is more readily transferred to the fluid driven by cooling system 610 and dissipated throughout mobile device 610. In contrast to conventional systems, in some embodiments cooling system 610 drives fluid to impinge on heat-generating structure 620. The fluid receives the heat produced by heat-generating structure 620 directly from impinging upon heat-generating structure 620 and/or from cooling system 610 (or other structures) that receive heat produced by heat-generating structure 620 via conduction. Cooling system 610 better cools heat-generating structure 620, allowing for improved thermal management and a less localized heating of housing 670. Thus, a region of housing 670 that might be a hot spot in the absence of cooling system 610 (indicated by the dashed oval in FIG. 6) instead has a temperature closer to that of the remaining portions of housing 670.

In addition, cooling system 610 may function as an active heat shield for heat-generating structure 620. Cooling system 610 has a nonzero thermal mass and is cooled by fluid flowing through and driven by cooling system 610. Thus, cooling system 610 is self-cooled. Because it is self-cooled, the portion of cooling system 610 closest to the interior surface of housing 670 (i.e. the top of FIG. 6) may be at a significantly lower temperature (e.g. at least eight degrees Celsius, at least ten degrees Celsius or more) than heat-generating structure 620. In addition, top cooling system 610 may be at a significantly lower temperature than the (bottom) portion of cooling system 610 closest to heat-generating structure 620. Because the top of cooling system 610 is at a lower temperature, less heat is radiated by cooling system 610 toward the interior surface of housing 670. Less of the heat originally produced by heat-generating structure 620 is radiated toward the interior surface of housing 670. Thus, cooling system 610 may be considered to function as a heat shield for heat-generating structure 620 and housing 670. Because less heat is transferred to the region of housing 670 proximate to heat-generating structure 620, the temperature of housing 670 in this region undergoes a reduced local temperature increase. Again, the region of housing 670 that might be a hot spot in the absence of cooling system 610 (indicated by the dashed oval in FIG. 6) instead has a temperature closer to that of the remaining portions of housing 670. Thus, the variation of temperature across the surface of the device (i.e. the surface of housing 670) may be reduced. The CTS for mobile device 600 may be increased.

For example, the CTS may be at least 0.5 for a steady-state power generated by mobile device 600 (e.g. generated by heat-generation component 620) of at least five Watts. In some embodiments, the CTS is greater than 0.5 for a steady-state power generated by mobile device 600 of at least five Watts. In some embodiments, the CTS is greater than 0.7 for a steady-state power consumed of at least five Watts. In some embodiments, the CTS is greater than 0.8 for the same power consumption range. In some such embodiments, the CTS is greater than 0.9 for a steady-state power consumption of at least five watts. In some embodiments, the CTSes described above may be maintained for higher power consumption, such as seven Watts or more. In some embodiments, the CTSes described above may be maintained in other (e.g. transient) states, such as upon start-up prior to steady-state behavior being reached. Because a higher CTS may be achieved, localized heating is better controlled. Thus, hot spots may be reduced in temperature, reduced in size, and/or eliminated. A user is less likely to experience uncomfortable variations in temperature. Usability of mobile device 600 may be enhanced. In addition, as discussed above, performance of mobile device 600 may be improved.

Figure 7:
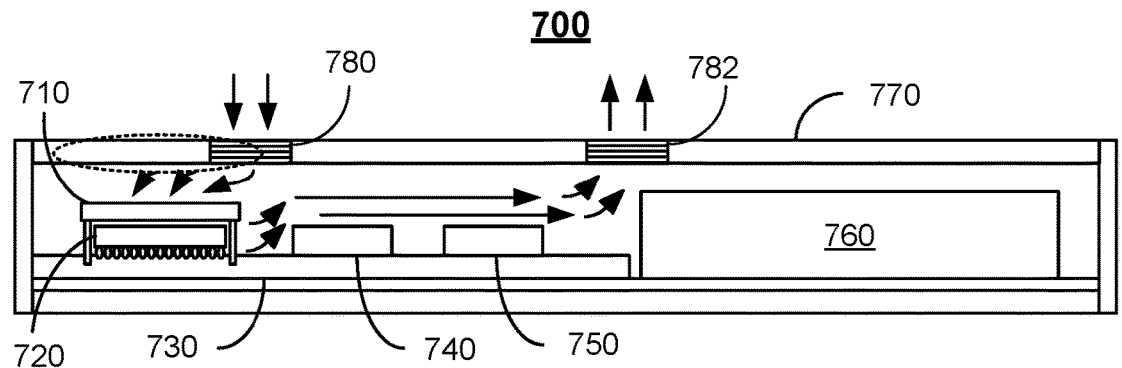
FIG. 7 depicts an embodiment of an active cooling system used in a mobile device.

FIG. 7 is a diagram depicting an embodiment of cooling system 710 used in a mobile device 700. Mobile device 700 may be a mobile phone (e.g. a smartphone), a tablet or notebook, a laptop computer, or other mobile device. Device 700 may also be another device, such as a server in a rack. In some embodiments, therefore, mobile device 700 is thin. For example, in some embodiments, mobile device 700 has a thickness (height along the smallest dimension) of not more than twenty-five ten millimeters. The thickness is not more than ten millimeters in some embodiments. In some such embodiments, the thickness of mobile device 700 is not more than eight millimeters. However, other thicknesses are possible. Cooling system 710 is analogous to cooling system(s) 100, 100', 200A, 200B, 300A, 300B, 400, 500, and/or 610. Cooling system 710 may thus include cell(s), cooling element(s), orifice plate(s) having apertures therein, top plate(s), pedestal(s), and/or other components (not explicitly shown) that are analogous to cells and their components described herein. However, for clarity, such structures are not shown.

Mobile device 700 is most analogous to device 600. Mobile device 700 includes cooling system 710, heat-generating component 720, substrate 730, components 740, 750 and 760, and housing 770 that are analogous to cooling systems 610, heat-generating component 620, substrate 630, components 640, 650 and 660, and housing 670, respectively. However, mobile device 700 also includes vents 780 and 782. Vents 780 and 782 allow for an exchange in fluid internal to housing 770 with fluid external to device 700. Although only two vents 780 and 782 are shown, another number may be present in other embodiments. Although particular locations of vents 780 and 782 are shown, vent(s) 780 and/or 782 may be located elsewhere. As can be seen by the unlabeled arrows in FIG. 7, fluid may be drawn in through vent 780 to cooling system 710. Cooling system 710 drives fluid from its distal side (further from heat-generating component 720) to the proximal side (closer to heat-generating component 720). Thus, fluid is driven toward heat-generating component 720. Heat from component 720 is transferred to the fluid. This transfer may be directly from heat-generating component 720 and/or from cooling system 710. The fluid exits the region from near the sides of component 720 carrying heat from component 720 away. The fluid traverses other portions of device 700, and exits device 700 through vent 782 in housing 770. Cooling system 710 may more efficiently and quietly cool component 720 at lower power.

In contrast to conventional systems, in some embodiments cooling system 710 drives fluid to impinge on heat-generating structure 720. The fluid receives the heat produced by heat-generating structure 720 directly from impinging upon heat-generating structure 720 and/or from cooling system 710 (or other structures) that receive heat produced by heat-generating structure 720 via conduction. Cooling system 710 better cools heat-generating structure 720, allowing for improved thermal management and a less localized heating of housing 770. In addition, cooling system 710 may function as an active heat shield and/or an active heat sink for heat-generating structure 620. Thus, a region of housing 770 that might be a hot spot in the absence of cooling system 710 (indicated by the dashed oval in FIG. 7) instead has a temperature closer to that of the remaining portions of housing 770. Thus, performance of component 720 may be improved and hot spots may be reduced or eliminated. Use of vents 780 and 782 may further enhance the ability of cooling system 710 to manage heat from component 720. In particular, cooler fluid from external to mobile device 700 may be drawn through vent 780 to and used for heat transfer. Thus, the ability of cooling system 710 to cooling device 720 may be improved.

Moreover, additional cooling systems can be employed and/or cooling system 710 can be increased in size, for example by adding more cells. Additional portions of device 700 may be cooled in an analogous manner. Further, in some embodiments, cooling system 710 (or additional, analogous cooling system(s)) might be oriented perpendicular to what is shown. In such an embodiment, cooling system 710 may be used to drive fluid flow across components 720, 740, 750 and 760 and/or through vents 780 and 782. In some embodiments, cooling system 700 may be considered to function as an active heat sink and/or an active heat shield. Thus, heat may be more effectively transferred from heat-generating component 720 to the fluid, removed from the region near heat-generating component 720 and dissipated.

Moreover, the CTS for mobile device 700 may be improved for reasons analogous to device 600. The CTS for mobile device 700 may be at least 0.5 for a steady-state power generated by mobile device 700 (e.g. generated by heat-generating component 720) of at least five Watts. In some embodiments, the CTS is greater than 0.5 for a steady-state power consumed by mobile device 700 of at least five Watts. In some embodiments, the CTS is greater than 0.7 for the same power consumption range at steady-state. In some embodiments, the CTS is greater than 0.8 for at least five Watts consumed by mobile device 700 (e.g. component 720) at steady-state. In some such embodiments, the CTS is greater than 0.9 for a steady-state power consumption of at least five watts. In some embodiments, the CTSes described above may be maintained for higher power consumption, such as seven Watts or more. In some embodiments, the CTSes described above may be maintained in other (e.g. transient) states, such as upon start-up prior to steady-state behavior being reached. Because a higher CTS may be achieved, localized heating is better controlled and hot spots may be reduced in temperature, reduced in size, or eliminated. Thus, usability and performance of mobile device 700 may be improved.

Figure 8:
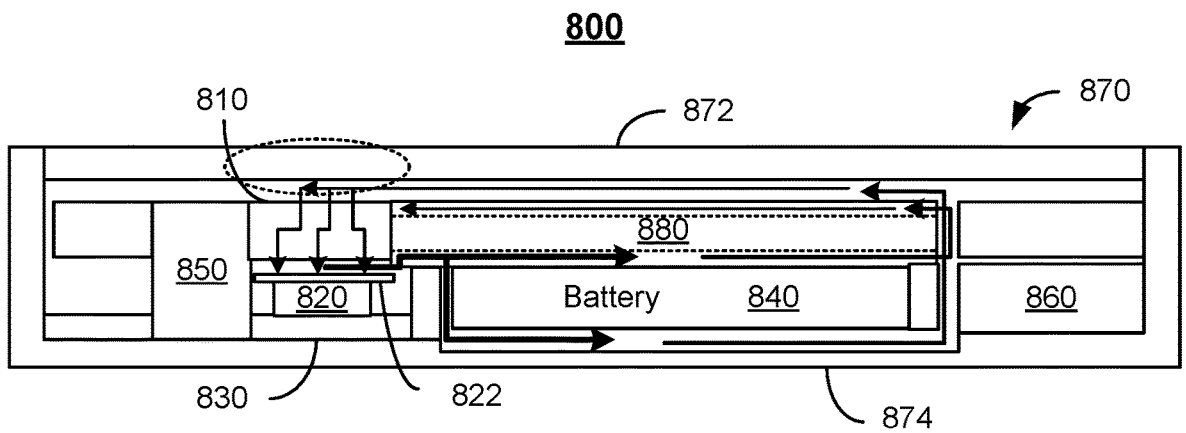
FIG. 8 depicts an embodiment of an active cooling system used in a mobile phone.

FIG. 8 depicts an embodiment of cooling system 810 used in a mobile phone 800. Mobile phone 800 may be a smartphone. In some embodiments, therefore, mobile phone 800 is thin. For example, in some embodiments, mobile device 800 has a thickness (height along the smallest dimension) of not more than eight millimeters. However, other thicknesses are possible. Cooling system 810 is analogous to cooling system(s) 100, 100', 200A, 200B, 300A, 300B, 400, 500, 610 and/or 710. Cooling system 810 may thus include cell(s), cooling element(s), orifice plate(s) having apertures therein, top plate(s), pedestal(s), and/or other components (not explicitly shown) that are analogous to cells and their components described herein. However, for clarity, such structures are not shown.

Mobile phone 800 is most analogous to device(s) 600 and/or 700. Mobile device 800 includes cooling system 810, main processor 820, motherboard 830, battery 840, camera module 850, additional electrical component 860, and housing 870 that are analogous to cooling systems 610/710, heat-generating component 620/720, substrate 630/730, components 640/740, 650/750 and 660/760, and housing 670, respectively. Mobile phone 800 also includes heat spreader 822 and midframe 880. Thus, the combination of heat spreader 822 and processor 820 may be viewed as analogous to heat-generating components 620 and/or 720. Housing 870 of mobile phone includes cover glass 872 and back cover 874. In some embodiments, cover glass 872 includes a display module. Midframe 880 may be formed of aluminum and/or other thermally (and/or electrically) conductive material(s). In some embodiments, midframe 880 includes grooves (indicated by the dotted line in FIG. 8) which may be used to direct the fluid flow in mobile phone 800. For example, such grooves may be up to 0.3 millimeters deep in some embodiments. In some embodiments, grooves may be omitted.

For mobile phone 800 one major source of heat is processor 820. Heat generated by processor 820 is thermally conducted to heat spreader 822. In addition, in some embodiments, cooling system 810 may be thermally conductively connected to heat spreader 822 and/or processor 820 to improve the transfer of heat from processor 820.

Cooling system 810 operates in an analogous manner to cooling systems 610 and/or 710. The transfer of heat in some cases may be seen by the unlabeled arrows in FIG. 8. The thickness of the lines in FIG. 8 may be viewed as indicating the temperature of the fluid. Thicker arrows indicated more heat carried by the fluid and a higher fluid temperature. Cooler fluid is driven by cooling system 810 toward heat spreader 822. In some embodiments, this fluid impinges on heat spreader 800. Fluid flow driven by cooling system 810 receives heat from heat spreader 822 and/or cooling system 810 (e.g. in steady-state) to transfer heat from processor 820. Arrows leaving the region of processor 820 are thicker to indicate the increased temperature of the fluid. The heated fluid flows through mobile phone 800, around battery 840 and along midframe 880. In some embodiments, fluid travels along the grooves in midframe 880 closer to battery 840. As the fluid flows, heat is transferred to the remaining portions (e.g. housing 870, battery 840 and midframe 880) of mobile device 800. The fluid cools. Thus, arrows around battery 840 and midframe 880 distal from processor 820 are thinner. The fluid is directed back toward glass cover 872. The fluid is directed back along midframe 880 toward processor 820. In some embodiments, fluid is directed along grooves in midframe 880. Further, the top of midframe 880 may be not more than 0.3 millimeters from the interior surface of glass cover 872. Thus, there is sufficient space (e.g. at least 0.3 millimeters and not more than 0.6 millimeters) for the fluid to flow towards processor 820. The fluid continues to cool (e.g. by transferring heat to midframe 880 and housing 870) as the fluid approaches cooling system 810. Thus, the arrows indicating the flow of fluid are thinner in this region. After circulating through mobile phone 800, the fluid may again be driven by cooling system 810 and used to transfer heat from processor 820 to other portions of mobile phone 800. Thus, cooling system 710 may more efficiently and quietly cool component 720 at lower power.

Cooling system 810 cools heat spreader 822, and thus processor 820, may function as an active heat sink and/or may act as an active heat shield. Performance of processor 820 and mobile phone 800 may be improved. Further, the CTS for mobile phone 800 may be improved for reasons analogous to device 600. Thus, a region of glass cover 872 that might be a hot spot in the absence of cooling system 810 (indicated by the dashed oval in FIG. 8) instead has a temperature closer to that of the remaining portions of housing 870. The CTS for mobile phone 800 may be at least 0.5 for a steady-state power generated by mobile phone 800 (e.g. generated by processor 820) of at least five Watts. In some embodiments, the CTS is greater than 0.5 for a steady-state power consumed by mobile phone 800 of at least five Watts. In some embodiments, the CTS is greater than 0.7 for the same power consumption range at steady-state. In some embodiments, the CTS is greater than 0.8 for at least five Watts consumed by mobile phone 800 (e.g. processor 820) at steady-state. In some such embodiments, the CTS is greater than 0.9 for a steady-state power consumption of at least five watts. In some embodiments, the CTSes described above may be maintained for higher power consumption, such as seven Watts or more. In some embodiments, the CTSes described above may be maintained in other (e.g. transient) states, such as upon start-up prior to steady-state behavior being reached. Because a higher CTS may be achieved, localized heating is better controlled and hot spots may be reduced in temperature, reduced in size, or eliminated. Thus, usability and performance of mobile phone 800 may be improved.

Figure 9:
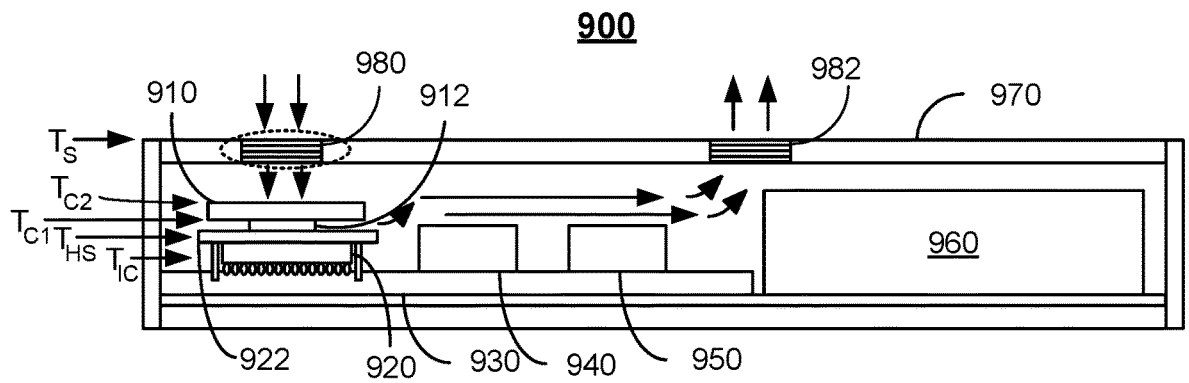
FIG. 9 depicts an embodiment of an active cooling system used in a mobile device such as a laptop computer.

FIG. 9 is a diagram depicting an embodiment of cooling system 910 used in a mobile device 900. Mobile device 900 may be a laptop computer, a tablet or notebook computer, or other mobile device. Device 900 may also be another device, such as a server in a rack. In some embodiments, therefore, mobile device 900 is thin. For example, in some embodiments, mobile device 900 has a thickness (height along the smallest dimension) of not more than twenty-five ten millimeters. The thickness is not more than ten millimeters in some embodiments. In some such embodiments, the thickness of mobile device 900 is not more than eight millimeters. However, other thicknesses are possible. Cooling system 910 is analogous to cooling system(s) 100, 100', 200A, 200B, 300A, 300B, 400, 500, and/or 610. Cooling system 910 may thus include cell(s), cooling element(s), orifice plate(s) having apertures therein, top plate(s), pedestal(s), and/or other components (not explicitly shown) that are analogous to cells and their components described herein. However, for clarity, such structures are not shown.

Mobile device 900 is most analogous to device 700. Mobile device 900 includes cooling system 910, heat-generating component 920, substrate 930, components 940, 950 and 960, and housing 770 that are analogous to cooling systems 710, heat-generating component 720, substrate 730, components 740, 750 and 760, and housing 770, respectively. Mobile device 900 also includes a heat spreader 922 or analogous device. Thus, processor 920 and heat spreader 922 may be considered part of the same heat-generating structure (termed herein "heat generating structure 920/922").

Mobile device 900 also includes vents 980 and 982 that are analogous to vents 780 and 782, respectively. Vents 980 and 982 allow for an exchange in fluid internal to housing 970 with fluid external to device 900. Although only two vents 980 and 982 are shown, another number may be present in other embodiments. Although particular locations of vents 980 and 982 are shown, vent(s) 980 and/or 982 may be located elsewhere. As can be seen by the unlabeled arrows in FIG. 9, fluid may be drawn in through vent 980 to cooling system 910.

Cooling system 910 drives fluid from its distal side 920 to the proximal side. Thus, fluid is driven toward heat-generating component 920. Heat from component 920 is transferred to the fluid. This transfer may be directly from heat-generating component 920 and/or from cooling system 910. The fluid exits the region, carrying heat from component 920 away. The fluid traverses other portions of device 900, and exits device 900 through vent 982. Cooling system 910 may more efficiently and quietly cool component 920 at lower power.

In contrast to conventional systems, in some embodiments cooling system 910 drives fluid to impinge on heat-generating structure 920. Cooling system 910 better cools heat-generating structure 920 and acts as an active heat sink and/or active heat shield. This allows for improved thermal management and a less localized heating of housing 970. Thus, a hot spot that might otherwise be present (indicated by the dashed oval in FIG. 9) may be reduced in size and/or temperature or eliminated. In addition, cooling system 710 may function as an active heat shield and/or an active heat sink for heat-generating structure 620. Thus, performance of component 720 may be improved, CTS may be improved, and/or hot spots may be reduced or eliminated. Moreover, additional cooling systems can be employed and/or cooling system 900 can be increased in size, for example by adding more cells. Portions of device 900 may be cooled in an analogous manner. Further, in some embodiments, cooling system 910 (or additional, analogous cooling system(s)) might be oriented differently.

For example, the temperature of heat-generating structure 920, $T_{JC}$, may be approximately ninety degrees Celsius. Heat from heat-generating structure 920 is transferred to head shield 912. Thus, the surface temperature of heat spreader 922, $T_{HS}$, may be approximately eighty-five through eighty-seven degrees or higher. Cooling system 910 is coupled to heat spreader 922 via pedestal 912. Heat from heat from heat spreader 922 (and thus heat-generating structure 92), is transferred to cooling system 910, typically via conduction. After some time (e.g. at steady state), the temperature ($T_{C1}$) of the portion of cooling system 910 closest to heat spreader 922 (e.g. the bottom of cooling system 910) rises in temperature. In some embodiments, $T_{C1}$ is on the order of eighty degrees Celsius. Because of the fluid driven through cooling system 910 (i.e. because cooling system 910 may be considered an active heat sink and/or an active heat shield), the portion of cooling system 910 closest to housing 970 (e.g. the top of cooling system 910) is significantly cooler. In some embodiments, the temperature, $T_{C2}$, of this portion of cooling system 910 is on the order of seventy degrees Celsius. Because $T_{C2}$ is significantly lower than $T_{JC}$ and/or $T_{C1}$, less energy is transferred to housing 970 and the hot spot may be mitigated or removed. For example, the external surface temperature ($T_{HS}$) of housing 970 in this region may be as low as forty degrees or less. Thus, hot spots may be mitigated or prevented.

The CTS for mobile device 900 may be improved for reasons analogous to devices 600, 700 and/or 800. The CTS for mobile device 900 may be in the ranges discussed herein for the powers described herein. Because a higher CTS may be achieved, localized heating is better controlled and hot spots may be reduced in temperature, reduced in size, or eliminated. Thus, usability and performance of mobile device 00 may be improved.

Figure 10:
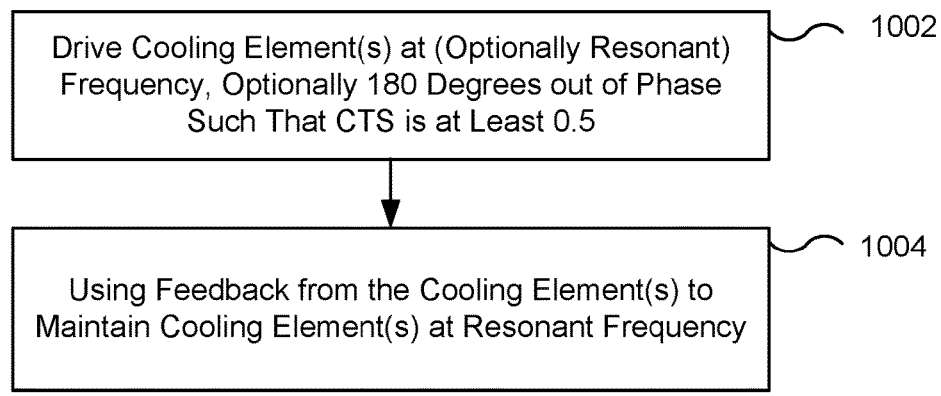
FIG. 10 is a flow chart depicting an embodiment of a technique for driving an active cooling element.

FIG. 10 is a flow chart depicting an embodiment of method 1000 for driving an active cooling element in a mobile device. Method 1000 may include steps that are not depicted for simplicity. Method 1000 is described in the context of piezoelectric cooling system 100. However, method 1500 may be used with other cooling systems including but not limited to systems and cells described herein.

One or more of the cooling element(s) in a cooling system is actuated to vibrate, at 1002. At 1002, an electrical signal having the desired frequency is used to drive the cooling element(s). In some embodiments, the cooling elements are driven at or near structural and/or acoustic resonant frequencies at 1002. The driving frequency may be 15 kHz or higher. If multiple cooling elements are driven at 1002, the cooling elements may be driven out-of-phase. In some embodiments, the cooling elements are driven substantially at one hundred and eighty degrees out-of-phase. For example, a cooling element may vibrate in the opposite direction as an adjacent cooling element. In some embodiments, individual cooling elements are driven out-of-phase. For example, different portions of a cooling element may be driven to vibrate in opposite directions. Also at 1002, the cooling elements are driven such that the mobile device in which the cooling system is used has a CTS of at least 0.5 for a steady-state power generated by mobile device of at least five Watts. In some embodiments, the cooling elements are driven such that the CTS for the device is greater than 0.5 for a steady-state power consumed of at least five Watts. In some embodiments, the CTS is greater than 0.7 for the same power consumption range at steady-state. In some embodiments, the CTS is greater than 0.8 for at least five Watts consumed by the mobile device at steady-state. In some such embodiments, the CTS is greater than 0.9 for a steady-state power consumption of at least five watts. In some embodiments, the CTSes described above may be maintained for higher power consumption, such as seven Watts. In some embodiments, the CTSes described above may be maintained in other (e.g. transient) states, such as upon start-up prior to steady-state behavior being reached. Because a higher CTS may be achieved, localized heating is better controlled and hot spots may be reduced in temperature, reduced in size, or eliminated.

Feedback from the piezoelectric cooling element(s) is used to adjust the driving current, at 1004. In some embodiments, the adjustment is used to maintain the frequency at or near the acoustic and/or structural resonant frequency/frequencies of the cooling element(s) and/or cooling system. Resonant frequency of a particular cooling element may drift, for example due to changes in temperature. Adjustments made at 1004 allow the drift in resonant frequency to be accounted for.

For example, cooling element(s) in cooling system 810 may be driven at its structural resonant frequency/frequencies, at 1002. This resonant frequency may also be at or near the acoustic resonant frequency for top chamber. At 1004, feedback is used to maintain the cooling element(s) of cooling system 810 at resonance and, in some embodiments in which multiple cooling elements are driven, one hundred and eighty degrees out of phase. Thus, the efficiency of cooling element(s) in driving fluid flow through cooling system 810 may be maintained. In some embodiments, 1004 includes sampling the current through the cooling element(s) and adjusting the current to maintain resonance and low input power. As a result, a higher CTS may be achieved, localized heating is better controlled and hot spots may be reduced in temperature, reduced in size, or eliminated.

Consequently, cooling systems, such as cooling system(s) 610, 710 and/or 810 may operate as described above. Mobile device incorporating cooling systems, such as device 600, 700 and/or 800, may also have an increased CTS, even for higher power consumption. Usability and performance of devices incorporating cooling systems and utilizing method 1000 may thus be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A mobile phone, comprising:
   a housing; and
   a cooling system including a plurality of active cooling cells and residing in the housing, the plurality of active cooling cells being configured to utilize vibrational motion of a plurality of cooling elements therein to drive a fluid for a heat-generating structure such that the mobile phone has a coefficient of thermal spreading (CTS) greater than 0.5 for a steady-state power generated by the mobile phone of at least five Watts, and an external surface temperature of the housing of not more than a standard temperature for the mobile phone for the steady-state power of five Watts, the plurality of cooling element residing within the housing;
   wherein the cooling system has a total height not exceeding two millimeters.

2. The mobile phone of claim 1, wherein each of the plurality of active cooling cells includes at least one cooling element of the plurality of cooling elements configured to undergo the vibrational motion to drive the fluid toward the heat-generating structure.

3. The mobile phone of claim 1, wherein the fluid is sealed within the housing.

4. The mobile phone of claim 3, wherein the mobile phone is configured to have a fluid path such that the fluid travels toward the heat-generating structure and past at least one additional structure before returning to a side of the plurality of active cooling cells distal from the heat-generating structure.

5. The mobile phone of claim 1, further comprising:
   at least one vent configured to allow the fluid to exit the housing to an environment external to the housing and to receive additional fluid from the environment.

6. The mobile phone of claim 1, wherein the total height is not more than 1.1 millimeters.

7. The mobile phone of claim 1, wherein the total height is not more than 1 millimeter.

8. The mobile phone of claim 1, wherein the CTS is greater than 0.9.

9. The mobile phone of claim 1, wherein the heat-generating structure further includes:
   a heat spreader, the plurality of active cooling cells being configured to drive the fluid toward the heat spreader.

10. The mobile phone claim 1, wherein the plurality of active cooling cells are configured to utilize the vibrational motion to drive the fluid toward the heat-generating structure such that the mobile phone has the external surface temperature of the housing of not more than forty degrees Celsius for the steady-state power of five Watts.

11. A mobile device, comprising:
    a housing having at least one dimension with a length of not more than twenty-five millimeters; and
    a cooling system including a plurality of active cooling cells residing in the housing, the plurality of active cooling cells being configured to utilize vibrational motion of a plurality of cooling elements therein to drive a fluid toward a heat-generating structure such that an external surface temperature of the housing is not more than a standard temperature for the mobile device for a steady-state power of five Watts, the plurality of cooling element residing within the housing;
    wherein the cooling system has a total height not exceeding two millimeters.

12. The mobile device of claim 11, wherein the mobile device has a coefficient of thermal spreading (CTS) greater than 0.5 for a total steady-state power generated by the mobile device of at least five Watts.

13. The mobile device of claim 12, wherein the total height is not more than 1.5 millimeters.

14. The mobile device of claim 11, wherein each of the plurality of active cooling cells includes at least one cooling element of the plurality of cooling elements configured to undergo the vibrational motion to drive the fluid toward the heat-generating structure.

15. The mobile device of claim 11, wherein the fluid is sealed within the housing.

16. The mobile device of claim 15, wherein the mobile device is configured to have a fluid path such that the fluid travels toward the heat-generating structure and past at least one additional structure before returning to a side of the plurality of active cooling cells distal from the heat-generating structure.

17. The mobile device of claim 11, further comprising:
    at least one vent configured to allow the fluid to exit the housing to an environment external to the housing and to receive additional fluid from the environment.

18. The mobile device of claim 11, wherein the length of the dimension does not exceed ten millimeters.

19. The mobile device of claim 11, wherein the plurality of active cooling cells are disposed between the heat-generating structure and the housing such that the plurality of active cooling cells comprise an active heat shield.

20. A method for cooling a mobile device having a housing, the method comprising:
    driving a plurality of active cooling cells in a cooling system residing in the housing, the plurality of active cooling cells being configured to utilize vibrational motion of a plurality of cooling elements therein to drive a fluid toward a heat-generating structure such that the mobile device has a coefficient of thermal spreading (CTS) greater than 0.5 for a total steady-state power generated by the mobile phone device of at least five watts Watts and an external surface temperature of the housing of not more than a standard temperature for the mobile device for the steady-state power of five Watts, the plurality of cooling element residing within the housing;
    wherein the cooling system has a total height not exceeding two millimeters.

21. The method of claim 20, wherein the driving further includes:
    driving the plurality of active cooling cells such that the vibrational motion is substantially at a structural resonance for the plurality of active cooling cells and substantially at a fluidic resonance for the plurality of active cooling cells.

\* \* \* \* \*